(12) United States Patent
Hakoi et al.

(10) Patent No.: US 10,989,957 B2
(45) Date of Patent: Apr. 27, 2021

(54) LIQUID CRYSTAL DISPLAY DEVICE

(71) Applicant: SHARP KABUSHIKI KAISHA, Sakai (JP)

(72) Inventors: Hiroyuki Hakoi, Sakai (JP); Akira Sakai, Sakai (JP); Kiyoshi Minoura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/618,973

(22) PCT Filed: Jun. 1, 2018

(86) PCT No.: PCT/JP2018/021104
§ 371 (c)(1),
(2) Date: Dec. 3, 2019

(87) PCT Pub. No.: WO2018/225631
PCT Pub. Date: Dec. 13, 2018

(65) Prior Publication Data
US 2020/0174316 A1    Jun. 4, 2020

(30) Foreign Application Priority Data

Jun. 8, 2017   (JP) .............................. JP2017-113794

(51) Int. Cl.
*G02F 1/1335* (2006.01)
*G02F 1/13357* (2006.01)

(52) U.S. Cl.
CPC .. *G02F 1/133536* (2013.01); *G02F 1/133605* (2013.01); *G02F 2203/01* (2013.01)

(58) Field of Classification Search
None
See application file for complete search history.

(56) References Cited

U.S. PATENT DOCUMENTS

| | | | |
|---|---|---|---|
| 2006/0290847 A1* | 12/2006 | Kim | G02F 1/13362 349/113 |
| 2007/0091230 A1* | 4/2007 | Ouderkirk | G02F 1/133536 349/96 |
| 2020/0257166 A1* | 8/2020 | Smith | G02F 1/1368 |

FOREIGN PATENT DOCUMENTS

| JP | 2003-029295 A | | 1/2003 |
|---|---|---|---|
| JP | 2011-242538 | * | 12/2011 |
| JP | 2011-242538 A | | 12/2011 |
| JP | 5066943 B2 | | 11/2012 |

(Continued)

*Primary Examiner* — Ryan Crockett
(74) *Attorney, Agent, or Firm* — ScienBiziP, P.C.

(57) ABSTRACT

The present invention provides a liquid crystal display device which has a high luminance and consumes less power by increasing the utilization efficiency of light. The liquid crystal display device includes: a first absorptive polarizing plate; a liquid crystal panel including a first substrate, a liquid crystal layer, and a second substrate in order from the first absorptive polarizing plate side; a second polarizing plate; and a backlight unit including a reflector in the stated order. The second substrate includes a reflective layer facing the second polarizing plate. A transmittance of polarized light vibrating in a direction parallel to a transmission axis of the second polarizing plate is greater than a transmittance of polarized light vibrating in a direction parallel to a transmission axis of the first absorptive polarizing plate.

4 Claims, 5 Drawing Sheets

(56) References Cited

FOREIGN PATENT DOCUMENTS

WO  2016/080385 A1  5/2016
WO  WO 2016/080385  *  5/2016

* cited by examiner

LIQUID CRYSTAL DISPLAY DEVICE

TECHNICAL FIELD

The present invention relates to a liquid crystal display device. More specifically, the present invention relates to a liquid crystal display device having a polarizing plate.

BACKGROUND ART

Liquid crystal display devices are utilized not only in television applications but also in applications such as smartphones, tablet PCs, and car navigation systems. In particular, the diffusion of smartphones has remarkably increased in recent years, it has also become possible to send and receive high-resolution video data by the development of a high-speed data communication network, and thus an increase in definition of liquid crystal display devices for smartphones is progressing.

When the definition of a liquid crystal display device is increased, the panel occupancy area of gate line and source line constituting a liquid crystal panel increases and thus the aperture ratio of pixel tends to decrease. For example, a 5.5 type WQHD (Wide Quad-High Definition) model has an aperture ratio of about 30%. The luminance of a liquid crystal display device decreases when the aperture ratio decreases. The decrease in luminance can be compensated by increasing the luminance of light emitted from a backlight unit (hereinafter also referred to as backlight light), but there is a possibility of an increase in power consumption when the luminance of backlight light is increased.

Hence, as a technique for increasing the utilization efficiency of backlight light, a technique in which backlight light is recycled by providing a reflective layer in the liquid crystal panel is proposed (see, for example, Patent Literatures 1 and 2).

Patent Literature 1 discloses that a reflective film which reflects light incident on the light shielding region from a light source to the light source side is provided at the light shielding region portion (portions at which gate line, source line, TFT, pixel reflective electrode and the like are present) on the upper surface of the pixel electrode side glass substrate as a pattern, an insulating film is provided on the reflective film as a pattern, and TFT, line and the like are constructed on this insulating film in a transmissive liquid crystal display device or a liquid crystal display device using a transmissive and a reflective concurrently. It is disclosed that, with such a configuration, the apparent light emission amount from the light source is increased as well as the utilization efficiency of light is improved as the incident light which has entered the liquid crystal display device from the light source but has not entered the transmission region, in which the pixel electrode is present, in the liquid crystal display device is reflected by the reflective film to return to the light source side, and is reflected by the reflector on the light source side to enter the liquid crystal display device again.

Patent Literature 2 discloses a liquid crystal display device which includes: a first reflective film formed on the upper surface of a thin film transistor substrate; an insulating film provided to cover the thin film transistor substrate including the first reflective film; a thin film transistor which is provided on the insulating film and has a gate electrode, a source electrode, and a drain electrode; a scanning line which is provided on the insulating film and connected to the gate electrode; a data line which is provided on the insulating film and connected to the drain electrode; and a pixel electrode which is provided on the insulating film and connected to the source electrode and in which the first reflective films are provided at least under the scanning line and the data line and are provided to be separated from each other.

CITATION LIST

Patent Literature

Patent Literature 1: JP 2003-29295 A
Patent Literature 2: JP 5066943 B

SUMMARY OF INVENTION

Technical Problem

In a conventional transmissive liquid crystal display device, the backlight light is mostly absorbed into a gate line, source line and the like formed on a thin film transistor (TFT) substrate, and there is room for investigation in order to ameliorate the utilization efficiency of light. In particular, as the aperture ratio of pixel is lower, the amount of backlight light absorbed is greater, thus the utilization efficiency of light decreases and an increase in power consumption is caused.

In Patent Literatures 1 and 2, measures are not taken to diminish absorption of the backlight light reflected by the reflective film into the polarizing plate, thus the utilization efficiency of light cannot be sufficiently improved, and there is room for further amelioration.

The present invention has been made in view of the above-described present situation, and an object thereof is to provide a liquid crystal display device which has a high luminance and consumes less power by increasing the utilization efficiency of light.

Solution to Problem

In liquid crystal display devices, polarizing plates having the same transmittance (hereinafter also referred to as transmittance k1) of polarized light vibrating in a direction parallel to the respective transmission axes are generally used as a polarizing plate provided on the viewer side of the liquid crystal panel (hereinafter also referred to as a front side polarizing plate) and a polarizing plate provided on the rear surface side of the liquid crystal panel (hereinafter also referred to as a back side polarizing plate). However, according to the investigation by the present inventors, it has been found out that a part of the polarized light, which is parallel to the transmission axis of the back side polarizing plate, among the recycled light which has been reflected by the reflective layer provided on the substrate facing the backlight unit of the liquid crystal panel is absorbed into the back side polarizing plate and thus the light utilization efficiency is not sufficient in the above general configuration.

The present inventors have investigated a method for improving the light utilization efficiency and focused on the configuration of the polarizing plate disposed on both surfaces of the liquid crystal panel. It has been thus found out that the recycled light which has been reflected by the reflective layer can be suppressed from being absorbed into the back side polarizing plate and the recycling effect can be maximized by setting the transmittance k1 of the back side polarizing plate to be higher than the transmittance k1 of the front side polarizing plate. As a result, the present inventors have conceived that the above problem can be brilliantly solved and achieved the present invention.

In other words, an aspect of the present invention is a liquid crystal display device which includes a first absorptive polarizing plate; a liquid crystal panel including a first substrate, a liquid crystal layer, and a second substrate in order from the first absorptive polarizing plate side; a second polarizing plate; and a backlight unit including a reflector in the stated order, the second substrate including a reflective layer facing the second polarizing plate, and a transmittance of polarized light vibrating in a direction parallel to a transmission axis of the second polarizing plate being greater than a transmittance of polarized light vibrating in a direction parallel to a transmission axis of the first absorptive polarizing plate.

Advantageous Effects of Invention

According to the present invention, it is possible to provide a liquid crystal display device which has a high luminance and consumes less power by increasing the utilization efficiency of light.

DESCRIPTION OF EMBODIMENTS

Hereinafter, embodiments and examples of the present invention will be described with reference to the drawings, but the present invention is not limited to the following embodiments and examples. In addition, the configurations of the respective embodiments and examples may be appropriately combined or changed within a range not departing from the gist of the present invention. Incidentally, in each drawing, the same symbol is denoted to the members which exert the same function.

Embodiment 1

Figure 1:
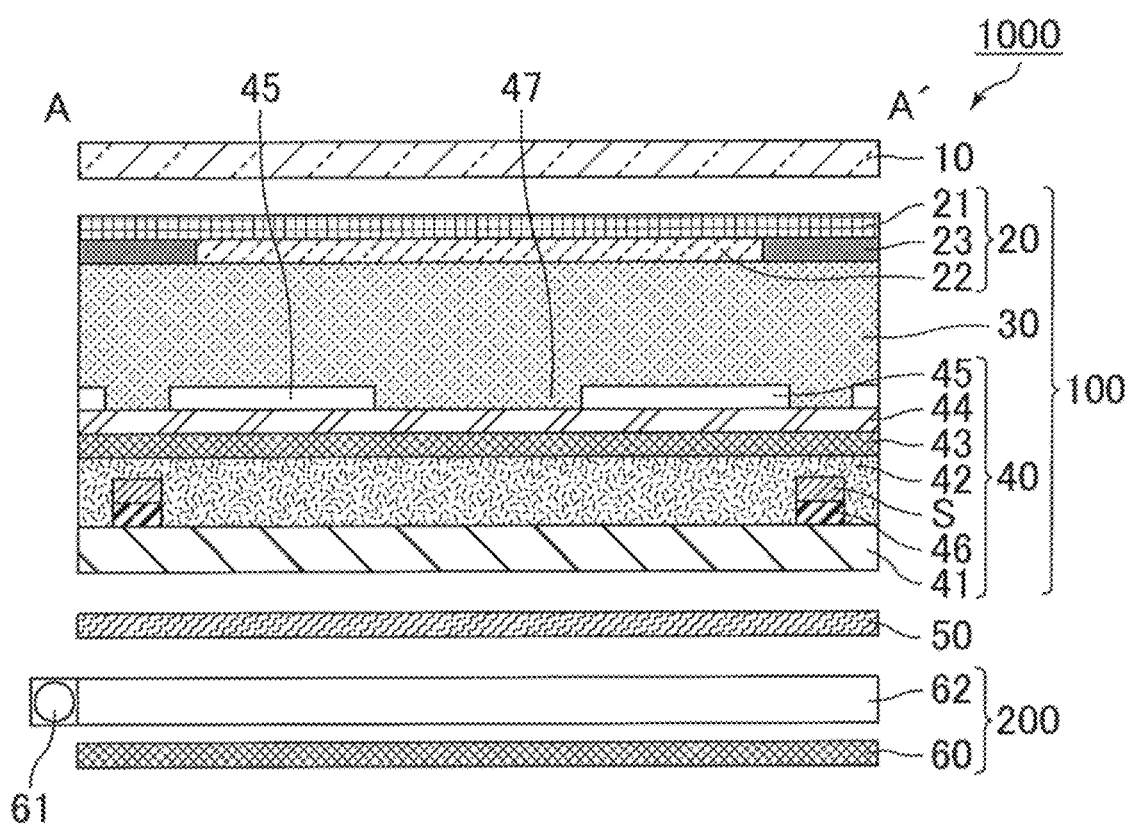
FIG. 1 is a schematic cross-sectional view of a liquid crystal display device according to Embodiment 1.
Figure 2:
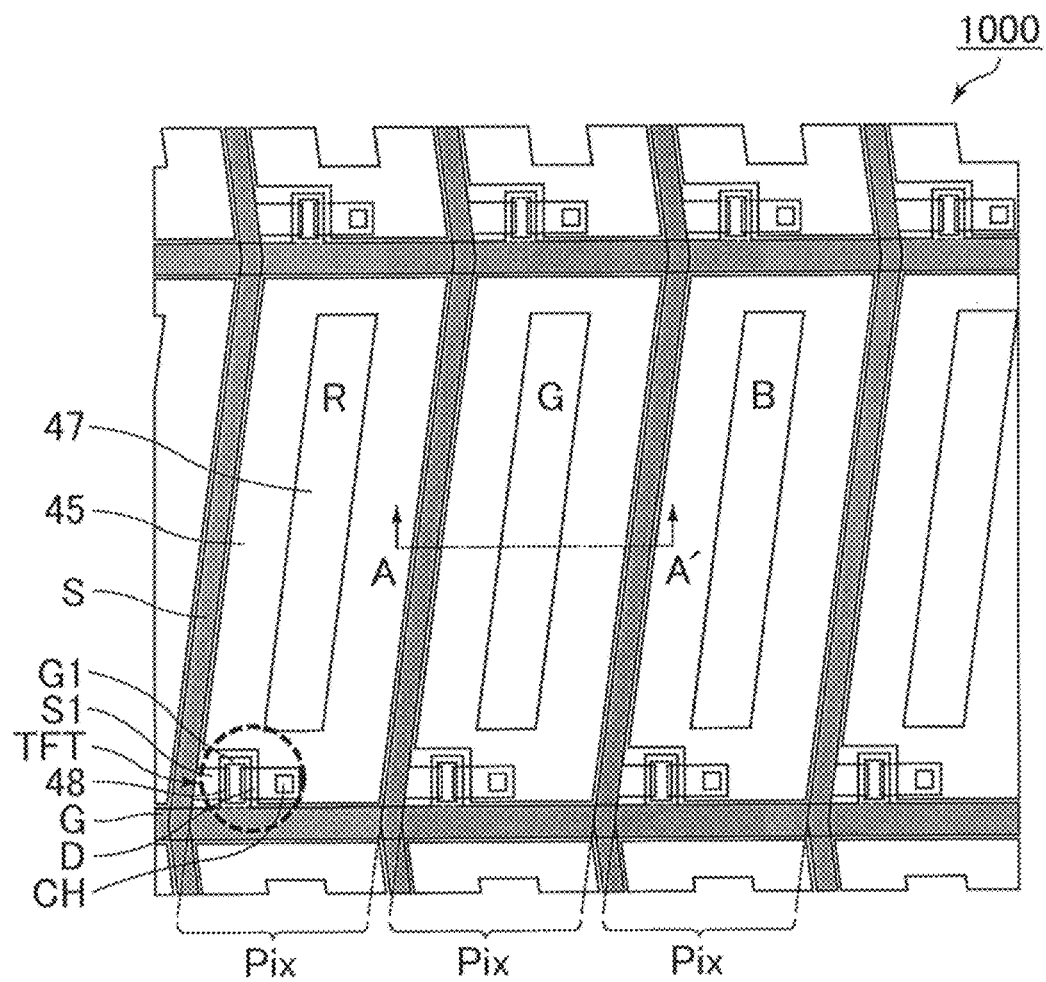
FIG. 2 is a schematic plan view of a liquid crystal display device according to Embodiment 1.

A liquid crystal display device 1000 according to Embodiment 1 will be described with reference to FIGS. 1 and 2. In Embodiment 1, the first substrate is a counter substrate and the second substrate is a thin film transistor substrate. FIG. 1 is a schematic cross-sectional view of the liquid crystal display device according to Embodiment 1. FIG. 2 is a schematic plan view of the liquid crystal display device according to Embodiment 1. FIG. 1 is a schematic cross-sectional view taken along the line A-A' in FIG. 2.

As illustrated in FIG. 1, the liquid crystal display device 1000 includes a first absorptive polarizing plate 10, a liquid crystal panel 100 having a counter substrate 20, a liquid crystal layer 30, and a thin film transistor substrate (TFT substrate) 40 in order from the first absorptive polarizing plate 10 side, a second absorptive polarizing plate 50, and a backlight unit 200 having a reflector 60 in the stated order. In Embodiment 1, the second polarizing plate is the second absorptive polarizing plate 50. The liquid crystal display device according to Embodiment 1 is a transmissive liquid crystal display device. Moreover, the liquid crystal display device 1000 includes the liquid crystal panel 100 in a FFS (Fringe Field Switching) mode. In the present specification, the surface of the liquid crystal panel 100 facing the backlight unit 200 is also referred to as "rear surface side", and the surface of the liquid crystal panel 100 on the opposite side to the rear surface side is also referred to as "observer side".

[First Absorptive Polarizing Plate]

A polarizing plate is an optical element which can extract a specific polarization component from incident light. The first absorptive polarizing plate 10 has a transmission axis and an absorption axis, and the transmission axis and the absorption axis meat each other at right angles. The absorptive polarizing plate transmits light that vibrates in the direction parallel to the transmission axis and absorbs light that vibrates in the direction parallel to the absorption axis. In the present specification, the transmittance of polarized light that vibrates in the direction parallel to the transmission axis of the first absorptive polarizing plate is also referred to as the "transmittance k1 of first absorptive polarizing plate". The transmittance k1 of the first absorptive polarizing plate can be measured, for example, using Ultraviolet-Visible Spectrophotometer V-7100 manufactured by JASCO Corporation.

As the first absorptive polarizing plate 10, for example, one obtained by adsorbing and aligning an anisotropic material such as a dichromatic iodine complex or dye on a polyvinyl alcohol (PVA) film can be used.

In a case in which the first absorptive polarizing plate 10 has a PVA film which is impregnated with iodine and stretched, the transmittance k1 of the first absorptive polarizing plate 10 can be adjusted by adjusting the iodine concentration in the PVA film.

The PVA film preferably has a protective layer on both surfaces. Examples of the protective layer include films containing cellulose-based resins such as diacetyl cellulose and triacetyl cellulose (TAC); (meth)acrylic resins; cycloolefin-based resins; olefin-based resins such as polypropylene; ester-based resins such as polyethylene terephthalate-based resins; polyamide-based resins; polycarbonate-based resins; and copolymer resins thereof. A polarizing plate in which a triacetyl cellulose (TAC) film is pasted to both surfaces of a film obtained by impregnating PVA with iodine and stretching the impregnated PVA is suitably used.

[Counter Substrate]

The counter substrate 20 has a transparent substrate 21, a color filter layer 22 and a black matrix 23 formed on the transparent substrate 21 in order from the transparent substrate 21 side, for example, in a case in which the liquid crystal display device 1000 performs color display. As the transparent substrate 21, a transparent substrate such as a glass substrate or a plastic substrate is used. The counter substrate 20 is also referred to as a color filter substrate. The color filter layer 22 is provided with a colored layer exhibiting any one color of red (R), green (G), or blue (B) corresponding to each subpixel, and the black matrix 23 is provided between the respective colored layers. The color combination of the color filter layer 22 is not limited and, for example, may be a combination of red, green, blue, and yellow and a combination of red, green, blue, and transparent. The color filter layer 22 may not be provided in a case in which the liquid crystal display device 1000 performs only monochrome display.

[Liquid Crystal Layer]

The liquid crystal layer 30 is formed in a region surrounded by a sealing material and the like in plan view. The liquid crystal layer 30 contains a liquid crystal material. The liquid crystal material is not limited, and those usually used in the field of liquid crystal display devices can be applied. Examples of the liquid crystal material include nematic liquid crystal exhibiting electro-optical properties. In a FFS mode, the liquid crystal material may exhibit positive anisotropy of dielectric constant or negative anisotropy of dielectric constant. An alignment film (not illustrated) may be formed between the liquid crystal layer 30 and the counter substrate 20 and between the liquid crystal layer 30 and the TFT substrate 40, respectively.

[Thin Film Transistor Substrate]

The TFT substrate 40 has a transparent substrate 41, a source line S, a first interlayer insulating layer 42, a common electrode 43, a second interlayer insulating layer 44, and a pixel electrode 45 in order from the transparent substrate 41 side, for example, as illustrated in FIG. 1. In a FFS mode, the common electrode 43 and the pixel electrode 45 are stacked with the second interlayer insulating layer 44 interposed therebetween. A fringe electric field is formed between the common electrode 43 and the pixel electrode 45, and the liquid crystal molecules in the liquid crystal layer 30 are aligned.

In addition, the liquid crystal display device 1000 includes a plurality of gate lines G extending in parallel to each other and a plurality of source lines S extending in parallel to each other on the transparent substrate (not illustrated) in plan view as illustrated in FIG. 2. The source line S extends in a direction different from that of the gate line G, and the plurality of gate lines G and the plurality of source lines S intersect each other. As illustrated in FIG. 2, the formation orientation of the source line S with respect to the gate line G may be different for every pixel adjacent in the extending direction of the source line S. A thin film transistor (TFT) is provided at each intersecting portion between the gate line G and the source line S. In addition, each subpixel surrounded by a pair of gate line G and source line S is provided with the pixel electrode 45 corresponding to each TFT.

The TFT is composed of a gate electrode GI extended from the gate line G, a source electrode S1 extended from the source line S, a semiconductor layer 48, and a drain electrode D which is provided on the semiconductor layer 48 and disposed so as to face the source electrode S1. The drain electrode D is electrically connected to the pixel electrode 45 via a contact hole CH provided in the pixel electrode 45.

The semiconductor layer 48 may be an oxide semiconductor layer containing an oxide semiconductor. An oxide semiconductor has a high electron mobility and a small leakage current amount, and it is thus possible to speed up the liquid crystal display device 1000 and to suppress the power consumption by using an oxide semiconductor in the semiconductor layer 48 constituting TFT. Examples of the oxide semiconductor layer include one containing at least one of indium (In), gallium (Ga), zinc (Zn), or cadmium (Cd). Among these, the oxide semiconductor layer preferably contains an oxide semiconductor (In—Ga—Zn—O-based semiconductor) containing indium, gallium, and zinc.

The TFT substrate 40 has a reflective layer 46 disposed so as to face the second absorptive polarizing plate 50. The reflective layer 46 is provided so as to face the backlight unit 200. By having the reflective layer 46, the light incident on the light shielding region such as the gate line G among the backlight light incident on the liquid crystal panel 100 is reflected by the reflective layer 46 and returned to the backlight unit 200 side. The light reflected by the reflective layer 46 is reflected by the reflector 60 provided in the backlight unit 200 and is emitted toward the liquid crystal panel 100 again, and thus the utilization efficiency of backlight light can be improved.

The reflective layer 46 is preferably formed on the most backlight unit 200 side of the TFT substrate 40. The reflective layer 46 is preferably formed immediately on the transparent substrate 41, but an interlayer insulating layer may be interposed between the transparent substrate 41 and the reflective layer 46. In FIG. 1, the reflective layer 46 is formed at a position closer to the transparent substrate 41 rather than the source line S. In plan view, the reflective layer 46 is preferably formed in a region overlapping the gate line G and the source line S. In FIG. 2, the region provided with the reflective layer 46 is colored in gray. In addition, the reflective layer 46 may also be provided in a region overlapping the TFT although it is not illustrated.

As the material for the reflective layer 46, for example, a highly reflective metal such as aluminum (Al), silver (Ag), an alloy (APC) of silver, palladium (Pd), and copper (Cu) can be used. In addition, a dielectric multilayer film (enhanced reflective film) in which a high refractive index layer such as $Ta_2O_3$ and a low refractive index layer such as $MgF_2$ are laminated and one in which the above highly reflective metal and enhanced reflective film are laminated can also be used. The reflective layer 46 can be formed, for example, by forming a metal film by a vapor deposition method, a sputtering method and the like and then performing patterning.

The common electrode 43 may be formed in a planar shape for every subpixel or over a plurality of subpixels. In a FFS mode, the pixel electrode 45 is provided with at least one aperture (slit) 47 or notch for every subpixel. As illustrated in FIG. 2, the formation orientation of the slit 47 with respect to the gate line G may be different between pixels adjacent to each other in the extending direction of the source line S. This makes it possible to set the alignment orientations of the liquid crystal molecules at the time of voltage application to be different between pixels adjacent to each other in the extending direction of the source line S, and thus viewing angle characteristics can be improved.

The common electrode 43 and the pixel electrode 45 are transparent electrodes, and examples thereof include oxide semiconductors such as indium tin oxide (ITO), indium zinc oxide (IZO), and zinc oxide (ZnO).

[Second Absorptive Polarizing Plate]

The second absorptive polarizing plate 50 has a transmission axis and an absorption axis, and the transmission axis and the absorption axis meat each other at right angles. The absorptive polarizing plate transmits light that vibrates in the direction parallel to the transmission axis and absorbs light that vibrates in the direction parallel to the absorption axis. Hereinafter, the transmittance of polarized light that vibrates in the direction parallel to the transmission axis of the second polarizing plate is also referred to as the "transmittance k1 of second polarizing plate". The second absorptive polarizing plate is not limited as long as the transmittance k1 is greater than that of the first absorptive polarizing plate 10. The transmittance k1 of the second absorptive polarizing plate can be measured by the same method as that for the transmittance k1 of the first absorptive polarizing plate.

As the second absorptive polarizing plate 50, it is preferable to use a polarizing plate having a PVA film which is impregnated with iodine or a dye and stretched. Specifically, a polarizing plate in which a triacetyl cellulose (TAC) film is pasted to both surfaces of a film obtained by impregnating PVA with iodine or a dye and stretching the impregnated PVA is suitably used.

The first absorptive polarizing plate 10 and the second absorptive polarizing plate 50 are disposed in crossed Nicols so that the absorption axes thereof meet each other at right angles. By disposing these plates in this manner, it is possible to control the alignment of the liquid crystal molecules in the liquid crystal layer 30, to adjust the amount of light transmitted through the liquid crystal panel 100, and to perform display.

Figure 3:
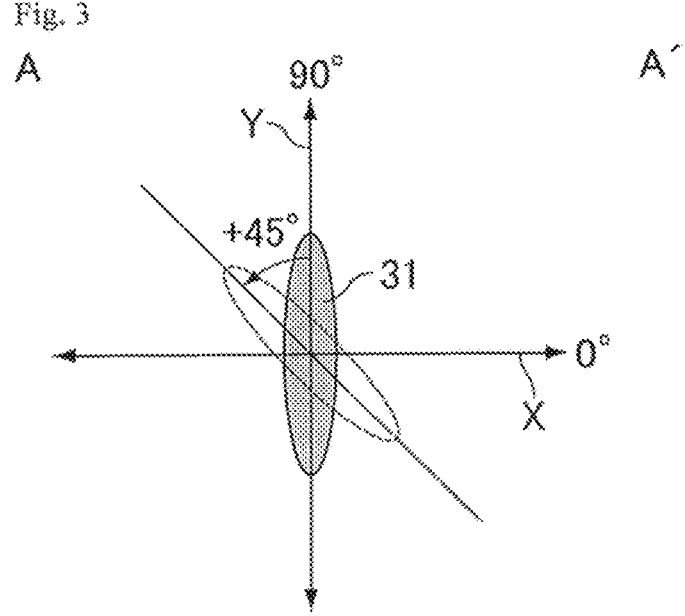
FIG. 3 is a schematic plan view illustrating an example of the alignment orientation of liquid crystal molecules in a liquid crystal display device according to Embodiment 1.

FIG. 3 is a schematic plan view illustrating an example of the alignment orientation of liquid crystal molecules in the liquid crystal display device according to Embodiment 1. FIG. 3 illustrates the alignment state in the case of using liquid crystal molecules exhibiting positive anisotropy of dielectric constant. In FIG. 3, X indicates the transmission axis direction of the first absorptive polarizing plate 10 and Y indicates the transmission axis direction of the second absorptive polarizing plate 50. Moreover, the liquid crystal molecules 31 when a voltage is not applied are indicated by a solid line and the liquid crystal molecules 31 when a voltage is applied are indicated by a broken line. The transmission axis direction and the alignment orientation of the liquid crystal molecules 31 both indicate those in the case of being viewed from the observer side. As illustrated in FIG. 3, when a voltage is not applied, the alignment orientation of the liquid crystal molecules 31 coincides with the transmission axis direction Y of the second absorptive polarizing plate 50, retardation is not generated, and thus black display is achieved. On the other hand, when a voltage is applied, the liquid crystal molecules 31 rotate counterclockwise by 45°, the alignment changes so as to form 45° with respect to the transmission axis direction X of the first absorptive polarizing plate 10 and the transmission axis direction X of the second absorptive polarizing plate 50, thus retardation is generated, and white display is achieved.

The transmittance of polarized light that vibrates in the direction parallel to the transmission axis of the second absorptive polarizing plate 50 is greater than the transmittance of polarized light that vibrates in the direction parallel to the transmission axis of the first absorptive polarizing plate 10. The second polarizing plate and the reflective layer 46 provided on the TFT substrate 40 are disposed so as to face each other. Among the light emitted from the backlight unit 200, only the light that vibrates in the transmission axis direction of the second absorptive polarizing plate 50 is transmitted through the second absorptive polarizing plate 50. The polarized light transmitted through the second absorptive polarizing plate 50 is reflected by the reflective layer 46 in a state of maintaining the polarization state and passes through the transmission axis of the second absorptive polarizing plate 50 again. Conventionally, it has been general to use polarizing plates having the same transmittance of polarized light that vibrates in the direction parallel to the transmission axis as the first absorptive polarizing plate 10 and the second absorptive polarizing plate 50. However, in the present invention, the light reflected by the reflective layer 46 to the backlight unit 200 side can be suppressed from being absorbed into the second absorptive polarizing plate 50 as compared to the conventional configuration by disposing the second absorptive polarizing plate 50 having a higher transmittance k1 than the first absorptive polarizing plate 10 disposed on the counter substrate 20 side on the TFT substrate 40 side, and thus the utilization efficiency of backlight light can be increased. For this reason, it is possible to increase the luminance of the liquid crystal display device 1000 and to diminish the power consumption.

[Backlight Unit]

The backlight unit 200 has the reflector 60. The backlight unit 200 used in the present embodiment is not limited as long as it irradiates the liquid crystal panel 100 with light and has the reflector 60 and may be a direct type or an edge light type. As a light source of the backlight unit 200, a general backlight light source, for example, a light source such as a cold cathode fluorescent lamp (CCFL) or a light emitting diode (LED) can be used.

When an edge light type is taken as an example, a configuration having an edge light 61, a light guide plate 62, and the reflector 60 as illustrated in FIG. 1 is mentioned. The edge light 61 is disposed on the end surface of the light guide plate 62 and the reflector 60 is disposed on the rear surface of the light guide plate 62. As the light guide plate 62, those usually used in the field of liquid crystal display devices can be used. Examples of the reflector 60 include an aluminum plate, a white polyethylene terephthalate (PET) film, and a reflective film (for example, ESR (Enhanced Specular Reflector) film manufactured by 3M)).

The backlight unit 200 can further appropriately use an optical sheet such as a prism sheet or a diffusion sheet. In this case, a light guide plate may be provided to be adjacent to the lower surface of the optical sheet. The light emitted from the edge light 61 enters the light guide plate 62 and is emitted toward the direction (observer side) to be illuminated by the light guide plate 62.

Embodiment 2

Figure 4:
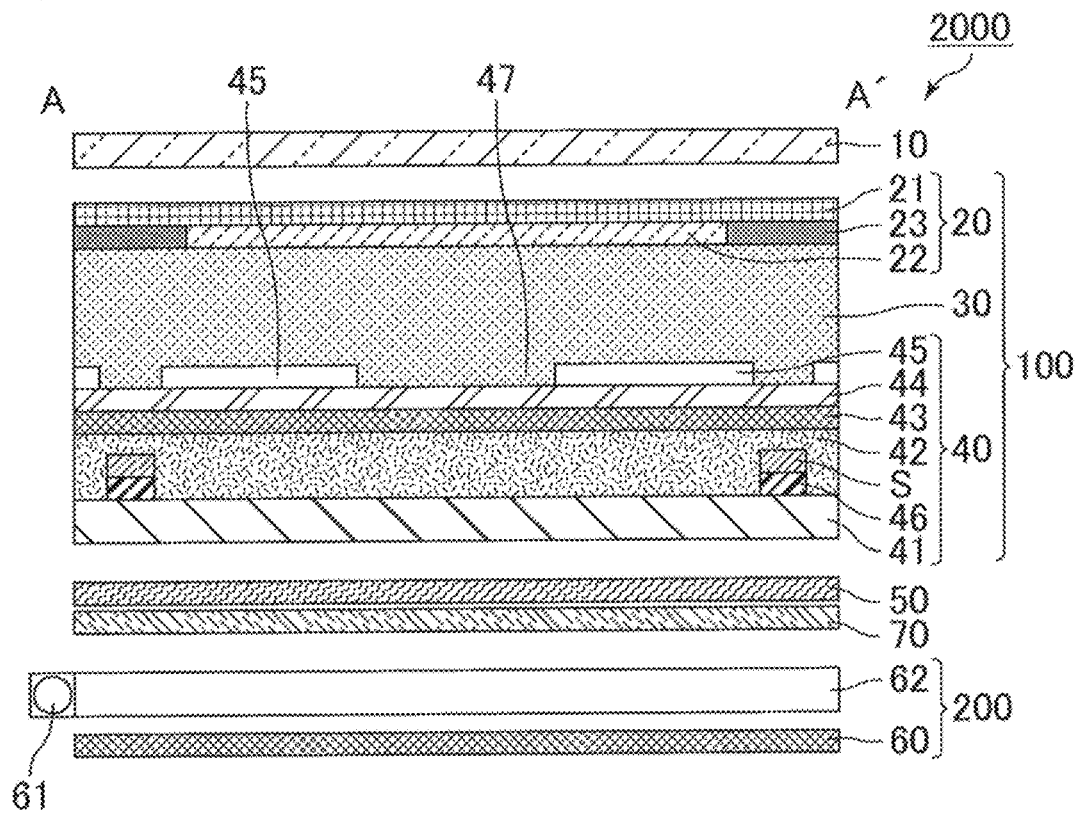
FIG. 4 is a schematic cross-sectional view of a liquid crystal display device according to Embodiment 2.

A liquid crystal display device 2000 according to Embodiment 2 will be described with reference to FIG. 4. In Embodiment 2, the first substrate is a counter substrate and the second substrate is a thin film transistor substrate. FIG. 4 is a schematic cross-sectional view of the liquid crystal display device according to Embodiment 2. Incidentally, a liquid crystal panel 100 is the same as that described in Embodiment 1, and the schematic plan view of the liquid crystal display device 2000 is the same as that illustrated in FIG. 2, thus the description thereof is omitted. FIG. 4 corresponds to the schematic cross-sectional view taken along the line A-A' in FIG. 2.

In Embodiment 2, the second polarizing plate is a second absorptive polarizing plate 50. As illustrated in FIG. 4, the liquid crystal display device 2000 further includes a reflective polarizing plate 70 between the second absorptive polarizing plate 50 and the backlight unit 200. The first absorptive polarizing plate 10 and the second absorptive polarizing plate 50 are disposed in crossed Nicols so that the absorption axes thereof meet each other at right angles.

The transmittance k1 of the second absorptive polarizing plate 50 is greater than the transmittance k1 of the first absorptive polarizing plate 10. For this reason, it is possible to suppress the light reflected to the backlight unit 200 side by the reflective layer 46 provided on the TFT substrate 40 from being absorbed into the second absorptive polarizing plate 50 and thus to increase the utilization efficiency of backlight light in the same manner as in Embodiment 1. For this reason, it is possible to increase the luminance of the liquid crystal display device 2000 and to diminish the power consumption.

In a case in which a plurality of polarizing plates are provided on the TFT substrate 40 side of the liquid crystal panel 100, the transmittance of polarized light that vibrates in the direction parallel to the transmission axis of the polarizing plate on the TFT substrate 40 side is determined by taking the transmittance of polarized light that vibrates in the direction parallel to the transmission axis of the polarizing plate provided at the position closest to the TFT substrate 40 as a reference. In other words, in Embodiment 2, the transmittance k1 of the second absorptive polarizing plate 50 only needs to be greater than the transmittance k1 of the first absorptive polarizing plate 10.

In Embodiment 2, the light absorbed into the absorption axis of the second absorptive polarizing plate 50 can be reflected to the backlight unit 200 side by the reflective polarizing plate 70 and reused by disposing the reflective polarizing plate 70 between the second absorptive polarizing plate 50 and the backlight unit 200, and thus the utilization efficiency of backlight light can be increased.

Furthermore, the contrast ratio of the liquid crystal display device 2000 can be improved by using the absorptive polarizing plate and the reflective polarizing plate concurrently. As will be described later, the contrast ratio of the liquid crystal display device can be determined by measuring each of the maximum luminance (white luminance) and minimum luminance (black luminance) of the liquid crystal display device and dividing the white luminance value by the black luminance value. By calculating the contrast ratio of the polarizing plate used in the liquid crystal display device, the influence of only the polarizing plate excluding other components such as a liquid crystal layer on the contrast ratio of the liquid crystal display device can be examined. Hereinafter, the contrast ratio improving effect by concurrent use of the absorptive polarizing plate and the reflective polarizing plate will be described focusing on the contrast ratio of polarizing plate.

The contrast ratio (CR) of polarizing plate is determined by the following Equation (1).

$$CR = (\text{parallel transmittance } Tp) \div (\text{orthogonal transmittance } Tc) \quad (1)$$

Both the parallel transmittance Tp and the orthogonal transmittance Tc are transmittances in a case in which at least one polarizing plate (front side polarizing plate) is disposed on the viewer side of the liquid crystal panel and at least one polarizing plate (back side polarizing plate) is disposed on the rear surface side of the liquid crystal display device. In the present specification, in a case in which a plurality of polarizing plates are provided on the viewer side or rear surface side of the liquid crystal panel, all the polarizing plates provided on the viewer side of the liquid crystal panel are referred to as "front side polarizing plates" and all the polarizing plates provided on the rear surface side of the liquid crystal panel are referred to as "back side polarizing plates". The parallel transmittance Tp is a transmittance in a case in which the transmission axes of the front side polarizing plate and back side polarizing plate are disposed so as to be parallel to each other. The orthogonal transmittance Tc is a transmittance in a case in which the transmission axes of the front side polarizing plate and back side polarizing plate are disposed so as to meet each other at right angles. The contrast ratio of polarizing plate is higher as the orthogonal transmittance Tc is lower.

The transmittance of polarized light that vibrates in the direction parallel to the transmission axis of the polarizing plate is denoted as transmittance k1 and the transmittance of polarized light that meets the transmission axis of the polarizing plate at right angles is denoted as transmittance k2. Here, when the transmittances k1 and k2 of the first absorptive polarizing plate are respectively denoted as k1$a$ and k2$a$, the transmittances k1 and k2 of the second polarizing plate are respectively denoted as k1$b$ and k2$b$, and the transmittances k1 and k2 of other polarizing plates are respectively denoted as k1$c$ and k2$c$, the parallel transmittance Tp is determined by the following Equation (2) and the orthogonal transmittance Tc is determined by the following Equation (3).

$$Tp = (\tfrac{1}{2}) \times (k1a \times k1b \times k1c + k2a \times k2b \times k2c) \quad (2)$$

$$Tc = (\tfrac{1}{2}) \times (k1a \times k2b \times k2c + k2a \times k1b \times k1c) \quad (3)$$

The contrast ratio of polarizing plate is represented by the following Equation (4) from Equations (1), (2), and (3) above.

$$CR = (k1a \times k1b \times k1c + k2a \times k2b \times k2c) \div (k1a \times k2b \times k2c + k2a \times k1b \times k1c) \quad (4)$$

In Embodiment 2, the first absorptive polarizing plate 10 is disposed as the front side polarizing plate and the second absorptive polarizing plate 50 and the reflective polarizing plate 70 are disposed as the back side polarizing plate. The second absorptive polarizing plate 50 corresponds to the "second polarizing plate", and the reflective polarizing plate 70 corresponds to the "other polarizing plate". As in Embodiments 1 and 3, in a case in which the back side polarizing plate is only an absorptive polarizing plate or only a reflective polarizing plate, the other polarizing plate is not provided, and thus it is calculated that k1$c$=100% and k2$c$=100%.

Hereinafter, the polarizing plate contrast ratio is specifically calculated by taking an absorptive polarizing plate C (k1=84.0%, k2=0.002%), an absorptive polarizing plate H (k1=89.0%, k2=0.083%), and a reflective polarizing plate A (k1=86.0%, k2=1.765%) used in Examples to be described later as examples. When taking a case in which the absorptive polarizing plate C is disposed as the front side polarizing plate and the absorptive polarizing plate H and the reflective polarizing plate 70 are disposed as the back side polarizing plate as an example corresponding to Embodiment 2, the polarizing plate contrast ratio is calculated by the following Equation (5).

$$CR = (84.0 \times 89.0 \times 86.0 + 0.002 \times 0.083 \times 1.765) \div \quad (5)$$
$$(84.0 \times 0.083 \times 1.765 + 0.002 \times 89.0 \times 86.0) =$$
$$642936 \div 27.614 \approx 23283$$

Meanwhile, when taking a case in which the absorptive polarizing plate C is disposed as the front side polarizing plate and the reflective polarizing plate 70 is disposed as the back side polarizing plate as an example corresponding to Embodiment 3, the polarizing plate contrast ratio is calculated by the following Equation (6).

$$CR = (84.0 \times 86.0 \times 100 + 0.002 \times 1.765 \times 100) \div \qquad (6)$$
$$(84.0 \times 1.765 \times 100 + 0.002 \times 86.0 \times 100) = 722400 \div 14843 \approx 49$$

As is clear from the comparison between Equations (5) and (6) above, the polarizing plate contrast ratio is higher when the second absorptive polarizing plate and the reflective polarizing plate are disposed as the back side polarizing plate as compared with the case in which only the reflective polarizing plate is disposed as the back side polarizing plate. This is because the portion of "k2$b$×k2$c$" in the denominator of Equation (4) in a case in which the second absorptive polarizing plate and the reflective polarizing plate are disposed as the back side polarizing plate becomes a value to be smaller than that in a case in which only the reflective polarizing plate is disposed as the back side polarizing plate by three digits. As described above, the contrast ratio of polarizing plate is improved by using the absorptive polarizing plate and the reflective polarizing plate concurrently.

[Reflection Type Polarizing Plate]

The reflective polarizing plate has a transmission axis and a reflection axis, and the transmission axis and the reflection axis meat each other at right angles. The reflective polarizing plate transmits light that vibrates in the direction parallel to the transmission axis and reflects light that vibrates in the direction parallel to the reflection axis. It is preferable that the reflective polarizing plate is disposed so that the absorption axis of the second absorptive polarizing plate 50 and the reflection axis of the reflective polarizing plate 70 are parallel to each other. This makes it possible to reflect the polarized light parallel to the absorption axis of the second absorptive polarizing plate 50 to the backlight unit 200 side by the reflective polarizing plate 70.

As the reflective polarizing plate 70, for example, a multilayer reflective polarizing plate, a wire grid polarizing plate, and a reflective polarizing plate using selective reflection of cholesteric liquid crystal can be used. Examples of the multilayer reflective polarizing plate include a reflective polarizing plate (trade name: DBEF) manufactured by 3M. The reflective polarizing plate using selective reflection of cholesteric liquid crystal is a combination of a cholesteric liquid crystal film and a λ/4 plate, and examples thereof include a reflective polarizing plate (trade name: PCF) manufactured by NITTO DENKO CORPORATION.

Embodiment 3

Figure 5:
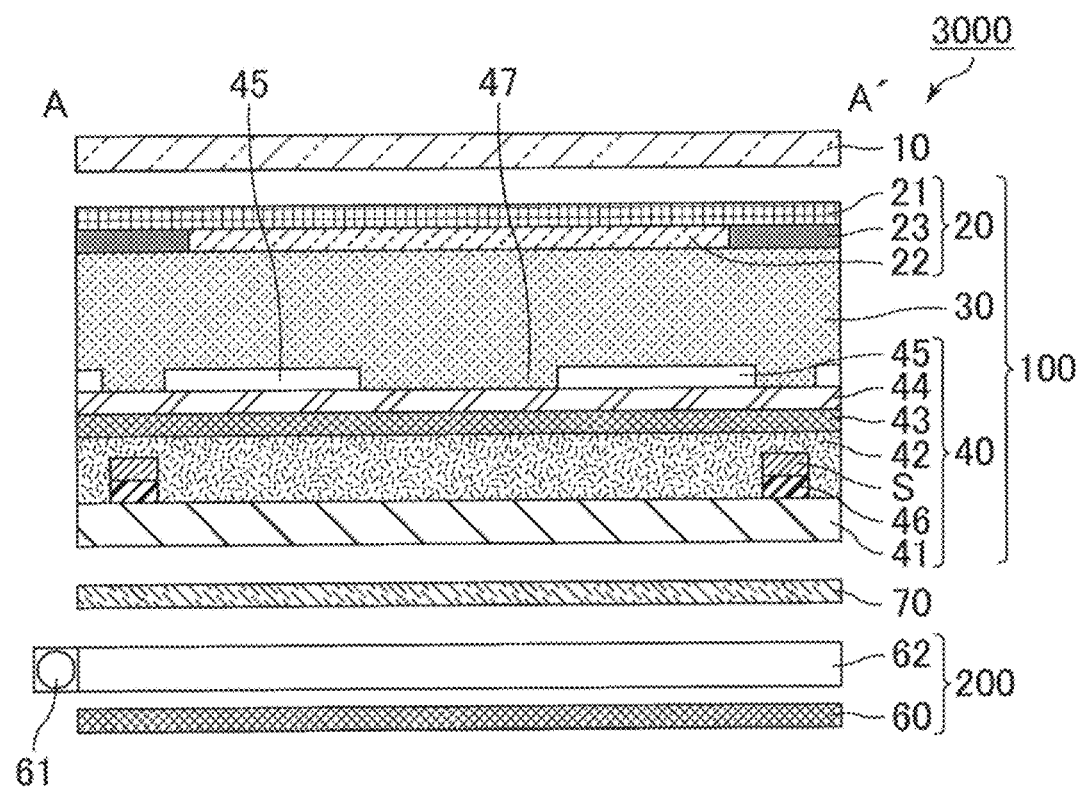
FIG. 5 is a schematic cross-sectional view of a liquid crystal display device according to Embodiment 3.

A liquid crystal display device 3000 according to Embodiment 3 will be described with reference to FIG. 5. In Embodiment 3, the first substrate is a counter substrate and the second substrate is a thin film transistor substrate. FIG. 5 is a schematic cross-sectional view of the liquid crystal display device according to Embodiment 3. Incidentally, a liquid crystal panel 100 is the same as that described in Embodiment 1, and the schematic plan view of the liquid crystal display device 3000 is the same as that illustrated in FIG. 2, thus the description thereof is omitted. FIG. 5 corresponds to the schematic cross-sectional view taken along the line A-A' in FIG. 2.

In Embodiment 3, the second polarizing plate is a reflective polarizing plate 70. As the reflective polarizing plate 70, those mentioned in Embodiment 2 can be used. The first absorptive polarizing plate 10 and the reflective polarizing plate 70 are disposed in crossed Nicols so that the absorption axes thereof meet each other at right angles.

The transmittance k1 of the reflective polarizing plate 70 is greater than the transmittance k1 of the first absorptive polarizing plate 10. For this reason, it is possible to suppress the light reflected to the backlight unit 200 side by a reflective layer 46 provided on a TFT substrate 40 from being reflected by the reflective polarizing plate 70 and thus to increase the utilization efficiency of backlight light. For this reason, it is possible to increase the luminance of the liquid crystal display device 3000 and to diminish the power consumption.

In Embodiment 3, the absorption of backlight light can be suppressed by providing only the reflective polarizing plate 70 on the TFT substrate 40 side of the liquid crystal panel 100 without providing the absorptive polarizing plate, and thus the utilization efficiency of backlight light can be further increased.

Embodiment 4

Figure 6:
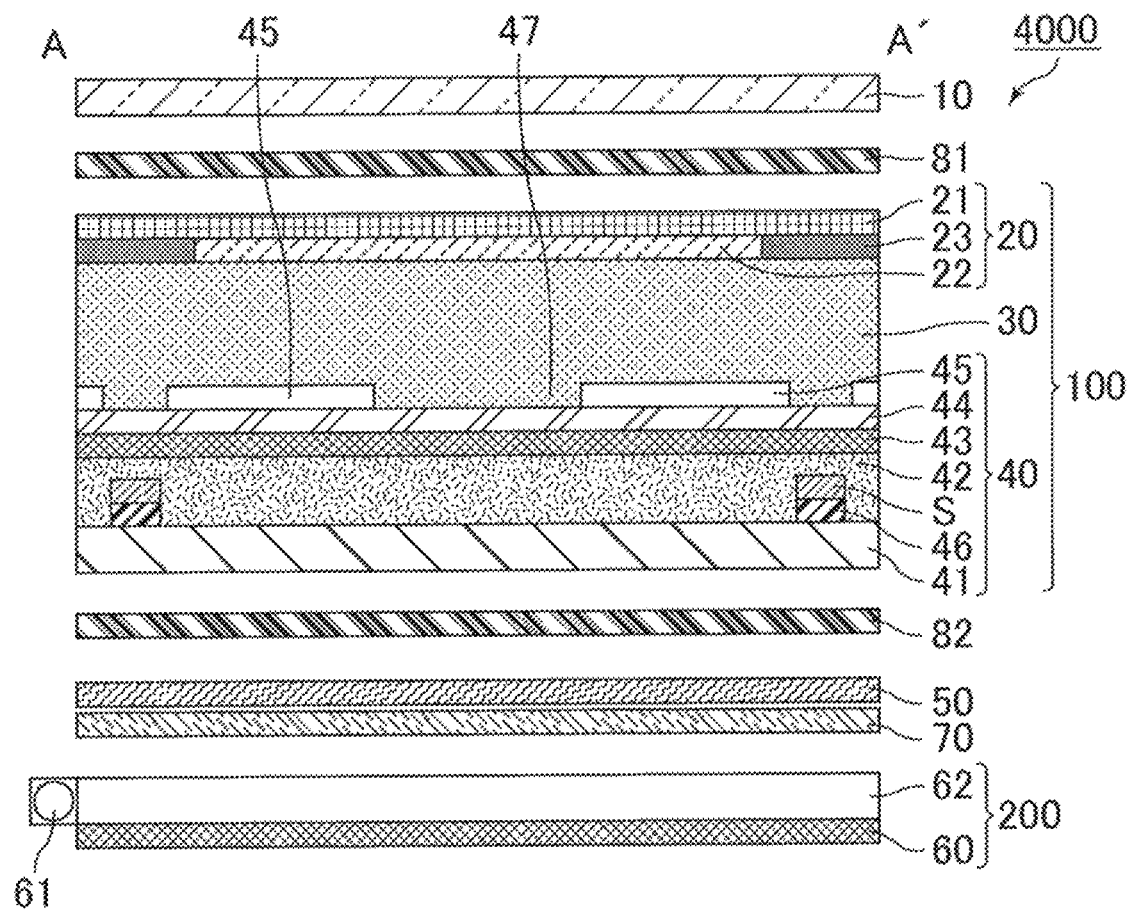
FIG. 6 is a schematic cross-sectional view of a liquid crystal display device according to Embodiment 4.

A liquid crystal display device 4000 according to Embodiment 4 will be described with reference to FIG. 6. In Embodiment 4, the first substrate is a counter substrate and the second substrate is a thin film transistor substrate. FIG. 6 is a schematic cross-sectional view of the liquid crystal display device according to Embodiment 4. Incidentally, a liquid crystal panel 100 is the same as that described in Embodiment 1, and the schematic plan view of the liquid crystal display device 4000 is the same as that illustrated in FIG. 2, thus the description thereof is omitted. FIG. 6 corresponds to the schematic cross-sectional view taken along the line A-A' in FIG. 2.

In Embodiment 4, the second polarizing plate is a second absorptive polarizing plate 50. The first absorptive polarizing plate 10 and the second absorptive polarizing plate 50 are disposed in crossed Nicols so that the absorption axes thereof meet each other at right angles. The transmittance k1 of the second absorptive polarizing plate 50 is greater than the transmittance k1 of the first absorptive polarizing plate 10. For this reason, it is possible to suppress the light reflected to the backlight unit 200 side by the reflective layer 46 provided on the TFT substrate 40 from being absorbed into the second absorptive polarizing plate 50 and thus to increase the utilization efficiency of backlight light in the same manner as in Embodiment 1. For this reason, it is possible to increase the luminance of the liquid crystal display device 4000 and to diminish the power consumption.

As illustrated in FIG. 6, the liquid crystal display device 4000 further includes a first retarder 81 between the first absorptive polarizing plate 10 and the liquid crystal panel 100 and a second retarder 82 between the liquid crystal panel 100 and the second polarizing plate.

[Retarder]

A retarder is a birefringent element which generates retardation between polarization components which meet at right angles. Examples of the retarder include a λ/2 plate having a retardation of 275 nm and a λ/4 plate having a retardation of 138 nm.

As the retarder, a polymer film which has been subjected to a stretching treatment and is generally used in the field of liquid crystal display devices, a liquid crystal film formed on a transparent substrate, and the like can be used.

Examples of the material for the polymer film include cycloolefin polymer, polycarbonate, polysulfone, polyethersulfone, polyethylene terephthalate, polyethylene, polyvinyl alcohol, norbornene, triacetyl cellulose, and diacetyl cellulose, and cycloolefin polymer is preferable among these. The retarder formed of cycloolefin polymer exhibits excellent durability and has an advantage that a change in retardation is small when being exposed to a high temperature environment and a high temperature and high humidity environment for a long period of time. As a film of cycloolefin polymer, "ZeonorFilm (registered trademark)" manufactured by ZEON CORPORATION, "ARTON (registered trademark) FILM" manufactured by JSR Corporation, and the like are known.

The liquid crystal film can be manufactured, for example, by coating a transparent base with a polymerizable liquid crystal compound and then performing a curing treatment such as ultraviolet irradiation or a heat treatment. Moreover, a ground alignment film may be formed on the transparent base before being coated with a polymerizable liquid crystal compound if necessary.

As the polymerizable liquid crystal compound, a liquid crystalline polymer having a photoreactive group is suitably used. Examples of the liquid crystalline polymer having a photoreactive group include polymers having side chains having a structure which concurrently has a substituent (mesogenic group) such as a biphenyl group, a terphenyl group, a naphthalene group, a phenylbenzoate group, an azobenzene group, or any derivative thereof and a photoreactive group such as a cinnamoyl group, a chalcone group, a cinnamylidene group, β-(2-phenyl)acryloyl group, a cinnamic acid group, or any derivative thereof and a structure such as an acrylate, a methacrylate, maleimide, N-phenylmaleimide, or siloxane in the main chain. Such a polymer may be a homopolymer composed of a single repeating unit or a copolymer composed of two or more repeating units having different side chain structures. Such copolymers include all of alternating, random, and craft types. Moreover, in such a copolymer, the side chain according to at least one repeating unit may be a side chain having a structure which concurrently has a mesogenic group and a photoreactive group as described above and the side chains according to other repeating units may not have the mesogenic group and the photoreactive group.

Examples of the solvent used in coating of the polymerizable liquid crystal compound include toluene, ethylbenzene, ethylene glycol monomethyl ether, ethylene glycol dimethyl ether, propylene glycol methyl ether, dibutyl ether, acetone, methyl ethyl ketone, ethanol, propanol, cyclohexane, cyclopentanone, methylcyclohexane, tetrahydrofuran, dioxane, cyclohexanone, n-hexane, ethyl acetate, butyl acetate, propylene glycol methyl ether acetate, methoxybutyl acetate, N-methylpyrrolidone, and dimethylacetamide. Any of these can be used singly or two or more of these can be used concurrently.

As the ground alignment film, a general alignment film in the field of liquid crystal display panels such as polyimide can be used. For the alignment treatment of the ground alignment film, rubbing, light irradiation, and the like can be used.

The liquid crystal film and ground alignment film may be formed on the transparent base and then transferred onto the first absorptive polarizing plate 10 and the second polarizing plate with an adhesive layer interposed therebetween.

Examples of the transparent base include a glass substrate and a plastic substrate. As the transparent base, for example, a zero retardation film such as "Z-TAC" manufactured by FUJIFILM Corporation is suitably used since it is able to decrease the retardation in the in-plane and thickness directions to almost zero.

It is preferable that the first retarder 81 imparts in-plane retardation of a ¼ wavelength to at least light having a wavelength of 550 nm. Specifically, it is preferable that the first retarder 81 imparts in-plane retardation of 100 nm or more and 160 nm or less to at least light having a wavelength of 550 nm. The first retarder 81 is, for example, a λ/4 plate.

As the first retarder 81 is a λ/4 plate, the first retarder 81 can function as a circularly polarizing plate by being combined with the first absorptive polarizing plate 10. This can suppress internal reflection (glare) of external light incident from the observer side of the liquid crystal panel 100, and it is thus possible to improve the contrast ratio of the liquid crystal display device 4000 and to realize favorable black display.

It is preferable that the second retarder 82 imparts in-plane retardation of a ½ wavelength to at least light having a wavelength of 550 nm. Specifically, it is preferable that the second retarder 82 imparts in-plane retardation of 200 nm or more and 360 nm or less to at least light having a wavelength of 550 nm. The second retarder 82 is, for example, a λ/2 plate. The in-plane retardation (Δn·d) of the liquid crystal layer is adjusted by Δn of the liquid crystal material and the cell thickness d so as to be equal to the sum of the in-plane retardations of the first retarder 81 and the second retarder 82.

Figure 7:
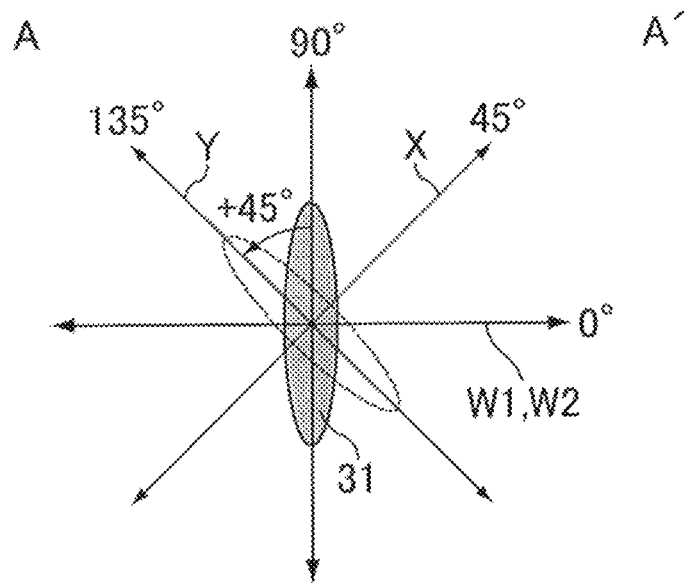
FIG. 7 is a schematic plan view illustrating an example of the alignment orientation of liquid crystal molecules in a liquid crystal display device according to Embodiment 4.

FIG. 7 is a schematic plan view illustrating an example of the alignment orientation of liquid crystal molecules in the liquid crystal display device according to Embodiment 4. FIG. 7 illustrates the alignment state in the case of using liquid crystal molecules exhibiting positive anisotropy of dielectric constant. In FIG. 7, X indicates the transmission axis direction of the first absorptive polarizing plate 10, Y indicates the transmission axis direction of the second absorptive polarizing plate 50, W1 indicates the slow axis direction of the first retarder 81, and W2 indicates the slow axis direction of the second retarder 82. Moreover, the liquid crystal molecules 31 when a voltage is not applied are indicated by a solid line and the liquid crystal molecules 31 when a voltage is applied are indicated by a broken line. The transmission axis direction, the transmission axis direction, and the alignment orientation of the liquid crystal molecules 31 all indicate those in the case of being viewed from the observer side.

As illustrated in FIG. 7, the transmission axis direction X of the first absorptive polarizing plate 10 and the transmission axis direction Y of the second absorptive polarizing plate 50 are disposed in crossed Nicols. The slow axis W1 of the first retarder 81 and the slow axis W2 of the second retarder 82 are disposed so as to be parallel to each other and to form an angle of 45° with the X direction and the Y direction. The alignment orientation of the liquid crystal molecules 31 when a voltage is not applied forms an angle of 45° with the X direction and the Y direction and is orthogonal to the W1 direction and the W2 direction. By disposing the polarizing plates in this manner, the in-plane retardation of the liquid crystal layer is canceled by the retardation of the first retarder 81 and the second retarder 82, and thus black display can be achieved.

On the other hand, when a voltage is applied, as the liquid crystal molecules 31 rotate counterclockwise by 45°, the retardation of the liquid crystal layer 30 disappears since the retardation matches with the transmission axis direction Y of the second absorptive polarizing plate 50, but the retardation of the first retarder 81 and the second retarder 82 remains, and thus white display can be achieved.

In order to sufficiently cancel the retardation of the liquid crystal layer 30 when a voltage is not applied, it is preferable to match the wavelength dispersion characteristics of the first retarder 81 and the second retarder 82 to the liquid crystal material. For this reason, it is preferable that the first retarder 81 and the second retarder 82 include the liquid crystal film described above.

When the second retarder 82 is a λ/2 plate, the angle formed by the slow axis of the λ/2 plate and the transmission axis of the second absorptive polarizing plate 50 is 45°, and thus the polarization direction of the backlight light that has passed through the second absorptive polarizing plate 50 rotates by 90°. Thereafter, the backlight light is reflected by the reflective layer 46 while maintaining the polarization state, then rotates by −90 degrees when being transmitted through the λ/2 plate again, and is transmitted through the transmission axis of the second absorptive polarizing plate 50, and thus the backlight light can be recycled.

Embodiment 5

Figure 8:
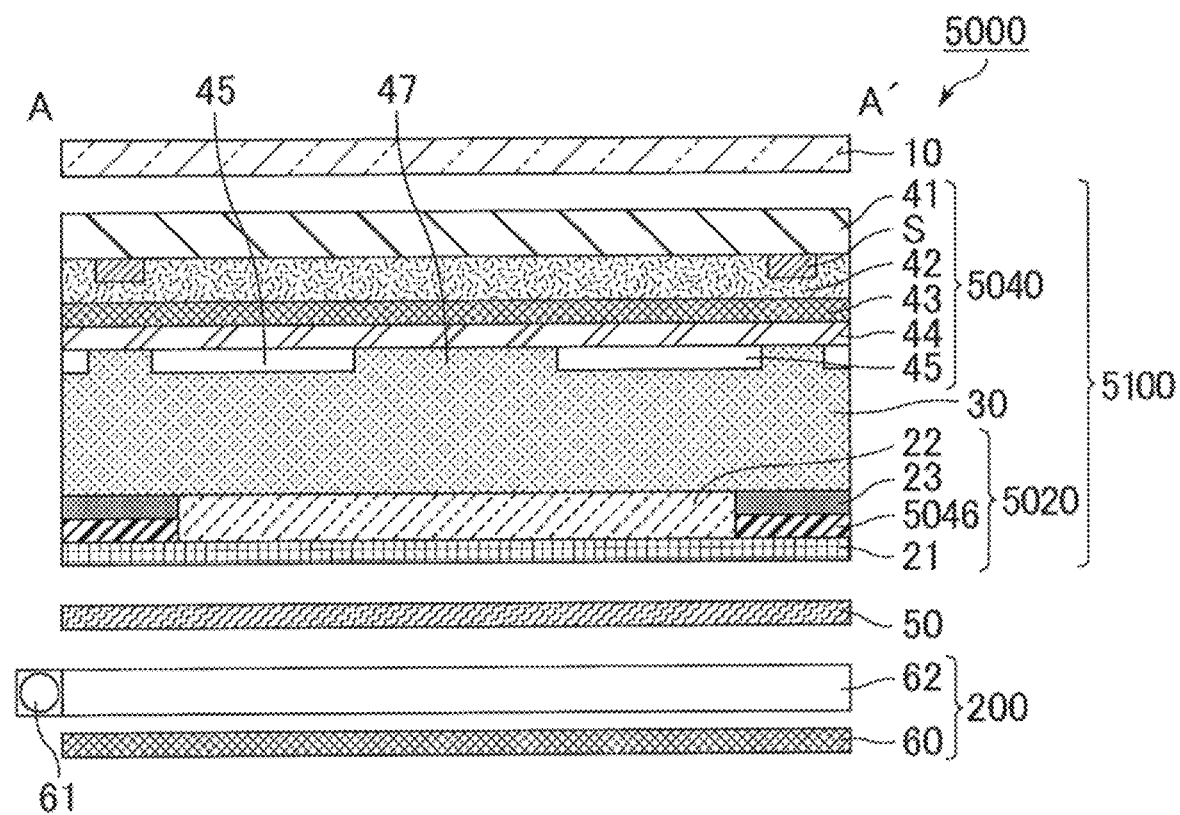
FIG. 8 is a schematic cross-sectional view of a liquid crystal display device according to Embodiment 5.

A liquid crystal display device 5000 according to Embodiment 5 will be described with reference to FIG. 8. In Embodiment 5, the first substrate is a counter substrate and the second substrate is a thin film transistor substrate. FIG. 8 is a schematic cross-sectional view of the liquid crystal display device according to Embodiment 5. A schematic plan view of the TFT substrate of the liquid crystal display device 5000 is the same as that illustrated in FIG. 2, and thus the description thereof is omitted.

As illustrated in FIG. 8, the liquid crystal display device 5000 includes a first absorptive polarizing plate 10, a liquid crystal panel 5100 having a TFT substrate 5040, a liquid crystal layer 30, and a counter substrate 5020 in order from the first absorptive polarizing plate 10 side, a second absorptive polarizing plate 50, and a backlight unit 200 having a reflector 60 in the stated order.

In Embodiment 5, the counter substrate 5020 has a reflective layer 5046 disposed so as to face the second absorptive polarizing plate 50. The reflective layer 5046 is provided so as to face the backlight unit 200. The reflective layer 5046 is preferably formed on the most backlight unit 200 side of the counter substrate 5020. The reflective layer 5046 is preferably formed immediately on a transparent substrate 21, but an interlayer insulating layer may be interposed between the transparent substrate 21 and the reflective layer 5046. The reflective layer 5046 may be provided on the counter substrate 5020 and formed in a region which is closer to the transparent substrate 21 rather than the black matrix 23 and overlaps the black matrix 23.

As the material for the reflective layer 5046, for example, a highly reflective metal such as aluminum (Al), silver (Ag), an alloy (APC) of silver, palladium (Pd), and copper (Cu) can be used. In addition, a dielectric multilayer film (enhanced reflective film) in which a high refractive index layer such as $Ta_2O_3$ and a low refractive index layer such as $MgF_2$ are laminated and one in which the above highly reflective metal and enhanced reflective film are laminated can also be used.

The reflective layer 5046 can be formed, for example, by forming a metal film and the like by a vapor deposition method, a sputtering method and the like and then performing patterning. In a case in which the reflective layer 5046 is formed in a region which overlaps the black matrix 23, it is also possible to form a metal film and the like for reflective layer formation, to form a metal film or a resin layer for black matrix 23 formation on the metal film and the like, and to collectively perform patterning.

Examples of the black matrix 23 include a black resist and a two-layer film of chromium (Cr) and chromium oxide (CrOx). In a case in which the black matrix 23 is a black resist, a metal film and the like are formed, then a positive resist is applied onto the metal film and the like, and the reflective layer 5046 is formed by photolithography using the positive resist. Subsequently, a negative black resist is applied and the black matrix 23 is formed on the reflective layer 5046 by photolithography to obtain a black matrix pattern. Meanwhile, in a case in which the black matrix 23 is a two-layer film of chromium and chromium oxide, a black matrix pattern of the reflective layer 5046 is formed, then Cr and CrOx are deposited using a sputtering apparatus, and etching is performed using a positive resist to obtain a black matrix pattern.

The transmittance k1 of the second absorptive polarizing plate 50 is greater than the transmittance k1 of the first absorptive polarizing plate 10. For this reason, in Embodiment 5, it is possible to suppress the light reflected to the backlight unit 200 side by the reflective layer 5046 provided on the counter substrate 5020 from being absorbed into the second absorptive polarizing plate 50 and thus to increase the utilization efficiency of backlight light. For this reason, it is possible to increase the luminance of the liquid crystal display device 5000 and to diminish the power consumption.

Embodiments 1 to 5 have been described with regard to a FFS mode but can also be applied to an IPS (In-Plane Switching) mode. Furthermore, Embodiments 1 to 3 and 5 can also be applied to a VA (Vertical Alignment) mode. In addition, in Embodiment 5, a case of having the polarizing plate configuration described in Embodiment 1 has been described as an example, but the polarizing plate configuration described in Embodiments 2 to 4 can also be applied.

EXAMPLES

Hereinafter, Examples and Comparative Examples in which liquid crystal display devices were actually fabricated are presented. Incidentally, the absorptive polarizing plates A to I and the reflective polarizing plate A used in Examples and Comparative Examples are all linear polarizing plates. In addition, as all of the absorptive polarizing plates A to I, polarizing plates in which a TAC film was pasted to both surfaces of a stretched film obtained by impregnating PVA with iodine were used.

Example 1

In Example 1, a liquid crystal display device in a transmissive FFS mode was fabricated. Example 1 is a specific example of Embodiment 2 and has the configuration illustrated in FIGS. 2 and 4. The aperture ratio of the liquid crystal display device according to Example 1 was 35%. The aperture ratio is the proportion of a region contributing to transmission display per subpixel. The liquid crystal display device according to Example 1 was a liquid crystal display device in a normally black mode, which was in a black display state when a voltage was not applied. The alignment orientation of liquid crystal molecules was set to be the same as that in FIG. 3.

First, an Al film and a metal film for gate line were formed on a glass substrate by a sputtering method, the Al film and the metal film for gate line were patterned in a lattice shape through photolithography and etching steps, and a gate line having an Al reflective layer was formed on the lower layer and a laminate of an Al reflective layer and a metal film for gate line was formed at the source line position. A gate insulating layer was formed on the gate line, and then a semiconductor layer, a source line and a source electrode, and a drain electrode were patterned. The source line was formed so as to overlap the source line pattern of the laminate of the Al reflective layer and the metal film for gate line. Thereafter, an interlayer insulating layer was formed, a planar common electrode was formed using ITO for every subpixel, and a pixel electrode was further formed on the common electrode with the interlayer insulating layer interposed therebetween. The pixel electrode was made of ITO and provided with a plurality of apertures. A TFT substrate was thus fabricated.

Next, a black matrix and a color filter layer were formed on a glass substrate, and a counter substrate was thus fabricated.

A horizontal alignment film was formed on each of the surfaces of the obtained TFT substrate and counter substrate on the liquid crystal layer side, and an alignment treatment was performed by rubbing. Thereafter, a liquid crystal material was dropped on one of the TFT substrate or the counter substrate, and the other substrate was bonded thereto using a sealing material to form a liquid crystal layer, thereby fabricating a liquid crystal panel in a FFS mode. A material having a positive anisotropy of dielectric constant was used as the liquid crystal material. The initial alignment orientation of the liquid crystal molecules can be controlled by the alignment treatment.

An absorptive polarizing plate A was pasted to the viewer side of the obtained liquid crystal panel. A liquid crystal panel, an absorptive polarizing plate E, and a reflective polarizing plate A were pasted on the rear surface side of the liquid crystal panel in the stated order. Examples of the reflective polarizing plate A include a reflective polarizing plate (trade name: DBEF) manufactured by 3M. When the extending direction of the gate line G illustrated in FIG. 2 was taken as 0°, these plates were disposed so that the transmission axis X of the absorptive polarizing plate A was in the 0° direction and the transmission axis Y of the absorptive polarizing plate E was in the 90° direction counterclockwise from the 0° direction in a case in which the liquid crystal display device was viewed from the observer side as illustrated in FIG. 3. The alignment treatment was performed so that the initial alignment orientation of the liquid crystal molecules when a voltage was not applied was in the 90° direction. When a voltage was applied, the liquid crystal molecules 31 rotate counterclockwise by 45° (+45°) from the 90° direction to perform white display. Incidentally, in FIG. 2, the formation orientation of the slit 47 is different between pixels adjacent in the extending direction of the source line S and thus the liquid crystal molecules 31 rotate clockwise by 45° (−45°) to perform white display in the pixels adjacent to the extending direction of the source line S when a voltage is applied.

Thereafter, a backlight unit was disposed on the rear surface side of the liquid crystal panel to complete the liquid crystal display device according to Example 1. As the backlight unit, an edge light type backlight unit having a reflective film (trade name: ESR) manufactured by 3M as a reflective plate was used.

In Example 1, the absorptive polarizing plate A provided on the counter substrate (CF substrate) side of the liquid crystal panel is the first absorptive polarizing plate. Among the polarizing plates provided on the TFT substrate side of the liquid crystal panel, the absorptive polarizing plate E provided at the position closest to the TFT substrate is the second polarizing plate. As presented in Table 1, the transmittance k1 of the absorptive polarizing plate E was greater than the transmittance k1 of the absorptive polarizing plate A. Incidentally, in the following Tables 1 to 14, "k2" denotes the transmittance of polarized light that vibrates in the direction parallel to the absorption axis in the case of an absorptive polarizing plate and denotes the transmittance of polarized light that vibrates in the direction parallel to the reflection axis in the case of a reflective polarizing plate.

TABLE 1

| Example 1 | Type of polarizing plate | k1(%) | k2(%) |
|---|---|---|---|
| CF substrate side | Absorptive polarizing plate A (First absorptive polarizing plate) | 82 | 0.001 |
| TFT substrate side | Absorptive polarizing plate E (Second polarizing plate) | 86 | 0.003 |
|  | Reflective polarizing plate A | 86 | 1.765 |

Example 2

Example 2 has the same configuration as that of Example 1 except that an absorptive polarizing plate B is used instead of the absorptive polarizing plate A disposed on the CF substrate side of the liquid crystal panel and an absorptive polarizing plate F is used instead of the absorptive polarizing plate E disposed on the TFT substrate side. As presented in Table 2, the transmittance k1 of the absorptive polarizing plate F was greater than the transmittance k1 of the absorptive polarizing plate B.

TABLE 2

| Example 2 | Type of polarizing plate | k1(%) | k2(%) |
|---|---|---|---|
| CF substrate side | Absorptive polarizing plate B (First absorptive polarizing plate) | 83 | 0.001 |
| TFT substrate side | Absorptive polarizing plate F (Second polarizing plate) | 87 | 0.004 |
|  | Reflective polarizing plate A | 86 | 1.765 |

Example 3

Example 3 has the same configuration as that of Example 1 except that an absorptive polarizing plate C is used instead of the absorptive polarizing plate A disposed on the CF substrate side of the liquid crystal panel and an absorptive polarizing plate G is used instead of the absorptive polarizing plate E disposed on the TFT substrate side. As presented in Table 3, the transmittance k1 of the absorptive polarizing plate G was greater than the transmittance k1 of the absorptive polarizing plate C.

TABLE 3

| Example 3 | Type of polarizing plate | k1(%) | k2(%) |
|---|---|---|---|
| CF substrate side | Absorptive polarizing plate C (First absorptive polarizing plate) | 84 | 0.002 |
| TFT substrate side | Absorptive polarizing plate G (Second polarizing plate) | 88 | 0.048 |
|  | Reflective polarizing plate A | 86 | 1.765 |

Example 4

Example 4 has the same configuration as that of Example 1 except that an absorptive polarizing plate C is used instead of the absorptive polarizing plate A disposed on the CF substrate side of the liquid crystal panel and an absorptive polarizing plate H is used instead of the absorptive polarizing plate E disposed on the TFT substrate side. As presented in Table 4, the transmittance k1 of the absorptive polarizing plate H was greater than the transmittance k1 of the absorptive polarizing plate C.

TABLE 4

| Example 4 | Type of polarizing plate | k1(%) | k2(%) |
|---|---|---|---|
| CF substrate side | Absorptive polarizing plate C (First absorptive polarizing plate) | 84 | 0.002 |
| TFT substrate side | Absorptive polarizing plate H (Second polarizing plate) | 89 | 0.083 |
| | Reflective polarizing plate A | 86 | 1.765 |

Example 5

Example 5 is a specific example of the liquid crystal display device in a transmissive FFS mode according to Embodiment 1 and has the configuration illustrated in FIGS. 1 and 2. Example 5 has the same configuration as that of Example 1 except that an absorptive polarizing plate C is used instead of the absorptive polarizing plate A disposed on the CF substrate side of the liquid crystal panel, the reflective polarizing plate A is not disposed on the TFT substrate side, and an absorptive polarizing plate H is used instead of the absorptive polarizing plate E. As presented in Table 5, the transmittance k1 of the absorptive polarizing plate H was greater than the transmittance k1 of the absorptive polarizing plate C.

TABLE 5

| Example 5 | Type of polarizing plate | k1(%) | k2(%) |
|---|---|---|---|
| CF substrate side | Absorptive polarizing plate C (First absorptive polarizing plate) | 84 | 0.002 |
| TFT substrate side | Absorptive polarizing plate H (Second polarizing plate) | 89 | 0.083 |

Example 6

Example 6 is a specific example of the liquid crystal display device in a transmissive FFS mode according to Embodiment 3 and has the configuration illustrated in FIGS. 2 and 5. Example 6 has the same configuration as that of Example 1 except that an absorptive polarizing plate C is used instead of the absorptive polarizing plate A disposed on the CF substrate side of the liquid crystal panel and only a reflective polarizing plate A is disposed on the TFT substrate side. As presented in Table 6, the transmittance k1 of the reflective polarizing plate A was greater than the transmittance k1 of the absorptive polarizing plate C.

TABLE 6

| Example 6 | Type of polarizing plate | k1(%) | k2(%) |
|---|---|---|---|
| CF substrate side | Absorptive polarizing plate C (First absorptive polarizing plate) | 84 | 0.002 |
| TFT substrate side | Reflective polarizing plate A (Second polarizing plate) | 86 | 1.765 |

Example 7

Example 7 has the same configuration as that of Example 6 except that an APC film was used as the reflective layer provided on the TFT substrate.

Example 8

Example 8 has the same configuration as that of Example 3 except that an APC film was used as the reflective layer provided on the TFT substrate.

Example 9

Example 9 has the same configuration as that of Example 4 except that an APC film was used as the reflective layer provided on the TFT substrate.

Example 10

Example 10 is a specific example of the liquid crystal display device in a transmissive FFS mode according to Embodiment 4 and has the configuration illustrated in FIGS. 2 and 6. The liquid crystal display device according to Example 10 was a liquid crystal display device in a normally black mode, which was in a black display state when a voltage was not applied. The alignment orientation of the liquid crystal molecules was the same as that in FIG. 7. Example 10 has the same configuration as that of Example 4 except that a first retarder is provided between the first absorptive polarizing plate and the liquid crystal panel, a second retarder is provided between the liquid crystal panel and the second polarizing plate, and the transmission axis orientations of the first absorptive polarizing plate and the second polarizing plate are different from each other.

In the same manner as in Example 1, a liquid crystal panel in a FFS mode was fabricated, a λ/4 plate (retardation: 138 nm) as a first retarder was pasted on the viewer side of the liquid crystal panel, and an absorptive polarizing plate C was pasted to the λ/4 plate. A λ/2 plate (retardation: 275 nm) as a second retarder was pasted on the rear surface side of the liquid crystal panel and an absorptive polarizing plate H and a reflective polarizing plate A were pasted to the λ/2 plate in the stated order.

When the extending direction of the gate line G illustrated in FIG. 2 was taken as 0°, these plates were disposed so that the transmission axis X of the absorptive polarizing plate C was in the 45° direction counterclockwise from the 0° direction, the slow axis W1 of the λ/4 plate and the slow axis W2 of the λ/2 plate were in the 0° direction, and the transmission axis Y of the absorptive polarizing plate H was in the 135° direction counterclockwise from the 0° direction in a case in which the liquid crystal display device was viewed from the observer side as illustrated in FIG. 7. Moreover, the alignment treatment was performed so that the initial alignment orientation of the liquid crystal molecules 31 when a voltage was not applied was in the 90° direction. When a voltage was applied, the liquid crystal molecules 31 rotate counterclockwise by 45° (+45°) from the 90° direction to perform white display. Incidentally, in FIG. 2, the formation orientation of the slit 47 is different between pixels adjacent in the extending direction of the source line S and thus the liquid crystal molecules 31 rotate clockwise by 45° (−45°) to perform white display in the pixels adjacent to the extending direction of the source line S when a voltage is applied.

Furthermore, the retardation of the liquid crystal layer was adjusted by changing the cell thickness so that black display was achieved when a voltage was not applied. In Example 10, the retardation (Δn·d) of the liquid crystal layer was set to 413 nm.

Example 11

Example 11 has the same configuration as that of Example 10 except that a retarder A (retardation: 238 nm) was inserted instead of the λ/2 plate as the second retardation plate and the thickness of the liquid crystal layer was changed. In Example 11, the retardation (Δn·d) of the liquid crystal layer was set to 376 nm.

Comparative Example 1

Comparative Example 1 has the same configuration as that of Example 1 except that an absorptive polarizing plate E is used instead of the absorptive polarizing plate A disposed on the CF substrate side of the liquid crystal panel and an absorptive polarizing plate A is used instead of the absorptive polarizing plate E disposed on the TFT substrate side. As presented in Table 7, the transmittance k1 of the absorptive polarizing plate A was lower than the transmittance k1 of the absorptive polarizing plate E.

TABLE 7

| Comparative Example 1 | Type of polarizing plate | k1(%) | k2(%) |
|---|---|---|---|
| CF substrate side | Absorptive polarizing plate E (First absorptive polarizing plate) | 86 | 0.003 |
| TFT substrate side | Absorptive polarizing plate A (Second polarizing plate) | 82 | 0.001 |
| | Reflective polarizing plate A | 86 | 1.765 |

Comparative Example 2

Comparative Example 2 has the same configuration as that of Example 1 except that an absorptive polarizing plate C is used instead of the absorptive polarizing plate A disposed on the CF substrate side of the liquid crystal panel and an absorptive polarizing plate C is used instead of the absorptive polarizing plate E disposed on the TFT substrate side. As presented in Table 8, the transmittance k1 of the second polarizing plate was equal to the transmittance k1 of the first absorptive polarizing plate since an absorptive polarizing plate C was used as both the second polarizing plate and the first absorptive polarizing plate.

TABLE 8

| Comparative Example 2 | Type of polarizing plate | k1(%) | k2(%) |
|---|---|---|---|
| CF substrate side | Absorptive polarizing plate C (First absorptive polarizing plate) | 84 | 0.002 |
| TFT substrate side | Absorptive polarizing plate C (Second polarizing plate) | 84 | 0.002 |
| | Reflective polarizing plate A | 86 | 1.765 |

Comparative Example 3

Comparative Example 3 has the same configuration as that of Example 1 except that an absorptive polarizing plate F is used instead of the absorptive polarizing plate A disposed on the CF substrate side of the liquid crystal panel and an absorptive polarizing plate B is used instead of the absorptive polarizing plate E disposed on the TFT substrate side. As presented in Table 9, the transmittance k1 of the absorptive polarizing plate B was lower than the transmittance k1 of the absorptive polarizing plate F.

TABLE 9

| Comparative Example 3 | Type of polarizing plate | k1(%) | k2(%) |
|---|---|---|---|
| CF substrate side | Absorptive polarizing plate F (First absorptive polarizing plate) | 87 | 0.004 |
| TFT substrate side | Absorptive polarizing plate B (Second polarizing plate) | 83 | 0.001 |
| | Reflective polarizing plate A | 86 | 1.765 |

Comparative Example 4

Comparative Example 4 has the same configuration as that of Example 1 except that an absorptive polarizing plate D is used instead of the absorptive polarizing plate A disposed on the CF substrate side of the liquid crystal panel and an absorptive polarizing plate D is used instead of the absorptive polarizing plate E disposed on the TFT substrate side. As presented in Table 10, the transmittance k1 of the second polarizing plate was equal to the transmittance k1 of the first absorptive polarizing plate since an absorptive polarizing plate D was used as both the second polarizing plate and the first absorptive polarizing plate.

TABLE 10

| Comparative Example 4 | Type of polarizing plate | k1(%) | k2(%) |
|---|---|---|---|
| CF substrate side | Absorptive polarizing plate D (First absorptive polarizing plate) | 85 | 0.002 |
| TFT substrate side | Absorptive polarizing plate D (Second polarizing plate) | 85 | 0.002 |
| | Reflective polarizing plate A | 86 | 1.765 |

Comparative Example 5

Comparative Example 5 has the same configuration as that of Example 1 except that an absorptive polarizing plate G is used instead of the absorptive polarizing plate A disposed on the CF substrate side of the liquid crystal panel and an absorptive polarizing plate C is used instead of the absorptive polarizing plate E disposed on the TFT substrate side. As presented in Table 11, the transmittance k1 of the absorptive polarizing plate C was lower than the transmittance k1 of the absorptive polarizing plate G.

TABLE 11

| Comparative Example 5 | Type of polarizing plate | k1(%) | k2(%) |
|---|---|---|---|
| CF substrate side | Absorptive polarizing plate G (First absorptive polarizing plate) | 88 | 0.048 |
| TFT substrate side | Absorptive polarizing plate C (Second polarizing plate) | 84 | 0.002 |
| | Reflective polarizing plate A | 86 | 1.765 |

Comparative Example 6

Comparative Example 6 has the same configuration as that of Example 1 except that an absorptive polarizing plate E is used instead of the absorptive polarizing plate A disposed on the CF substrate side of the liquid crystal panel. As presented in Table 12, the transmittance k1 of the second polarizing plate was equal to the transmittance k1 of the first absorptive polarizing plate since an absorptive polarizing plate E was used as both the second polarizing plate and the first absorptive polarizing plate.

TABLE 12

| Comparative Example 6 | Type of polarizing plate | k1(%) | k2(%) |
|---|---|---|---|
| CF substrate side | Absorptive polarizing plate E (First absorptive polarizing plate) | 86 | 0.003 |
| TFT substrate side | Absorptive polarizing plate E (Second polarizing plate) | 86 | 0.003 |
| | Reflective polarizing plate A | 86 | 1.765 |

Comparative Example 7

Comparative Example 7 has the same configuration as that of Example 1 except that an absorptive polarizing plate H is used instead of the absorptive polarizing plate A disposed on the CF substrate side of the liquid crystal panel and an absorptive polarizing plate C is used instead of the absorptive polarizing plate E disposed on the TFT substrate side. As presented in Table 13, the transmittance k1 of the absorptive polarizing plate C was lower than the transmittance k1 of the absorptive polarizing plate H.

TABLE 13

| Comparative Example 7 | Type of polarizing plate | k1(%) | k2(%) |
|---|---|---|---|
| CF substrate side | Absorptive polarizing plate H (First absorptive polarizing plate) | 89 | 0.083 |
| TFT substrate side | Absorptive polarizing plate C (Second polarizing plate) | 84 | 0.002 |
| | Reflective polarizing plate A | 86 | 1.765 |

Comparative Example 8

Comparative Example 8 has the same configuration as that of Example 5 except that an absorptive polarizing plate C is used instead of the absorptive polarizing plate H as the polarizing plate disposed on the TFT substrate side of the liquid crystal panel. As presented in Table 14, the transmittance k1 of the second polarizing plate was equal to the transmittance k1 of the first absorptive polarizing plate since an absorptive polarizing plate C was used as both the second polarizing plate and the first absorptive polarizing plate.

TABLE 14

| Comparative Example 8 | Type of polarizing plate | k1(%) | k2(%) |
|---|---|---|---|
| CF substrate side | Absorptive polarizing plate C (First absorptive polarizing plate) | 84 | 0.002 |
| TFT substrate side | Absorptive polarizing plate C (Second polarizing plate) | 84 | 0.002 |

With regard to Examples and Comparative Examples, the luminance and contrast ratio of the liquid crystal display devices were measured by the following methods, and the luminance improving effect and the contrast ratio improving effect were examined.

<Measurement of Luminance>

The luminance was measured in a dark room using SR-UL1 manufactured by TOPCON CORPORATION as a measuring apparatus.

<Measurement of Contrast>

The contrast ratio of the liquid crystal display device was calculated by the following equation after measuring the maximum luminance (white luminance) and the minimum luminance (black luminance) of the liquid crystal display device in a dark room. The luminance was measured using SR-UL1 manufactured by TOPCON CORPORATION.

Contrast ratio of liquid crystal display device white luminance black luminance

<Examination 1 on Luminance Improving Effect>

The luminances in Example 1, Comparative Example 1, and Comparative Example 2 (Combination 1), Example 2, Comparative Example 3, and Comparative Example 4 (Combination 2), Example 3, Comparative Example 5, and Comparative Example 6 (Combination 3), and Example 4 and Comparative Example 7 (Combination 4) were compared with each other. The examination results of Combinations 1 to 4 are presented in Table 15.

TABLE 15

| | Display style of liquid crystal display device | | Aperture ratio (%) | Material of reflective layer | Configuration of polarizing plate | |
|---|---|---|---|---|---|---|
| | Type of transmission | Display mode | | | CF substrate side | TFT substrate side Viewer side |
| Comparative Example 1 | Transmissive | FFS | 35 | Al | Absorptive polarizing plate E | Absorptive polarizing plate A |
| Comparative Example 2 | Transmissive | FFS | 35 | Al | Absorptive polarizing plate C | Absorptive polarizing plate C |
| Example 1 | Transmissive | FFS | 35 | Al | Absorptive polarizing plate A | Absorptive polarizing plate E |
| Comparative Example 3 | Transmissive | FFS | 35 | Al | Absorptive polarizing plato F | Absorptive polarizing plate B |
| Comparative Example 4 | Transmissive | FFS | 35 | Al | Absorptive polarizing plate D | Absorptive polarizing plate D |
| Example 2 | Transmissive | FFS | 35 | Al | Absorptive polarizing plate B | Absorptive polarizing plate F |
| Comparative Example 5 | Transmissive | FFS | 35 | Al | Absorptive polarizing plate G | Absorptive polarizing plate C |
| Comparative Example 6 | Transmissive | FFS | 35 | Al | Absorptive polarizing plate E | Absorptive polarizing Mate E |
| Example 3 | Transmissive | FFS | 35 | Al | Absorptive polarizing plate C | Absorptive polarizing plate G |

TABLE 15-continued

| | | | | | | |
|---|---|---|---|---|---|---|
| Comparative Example 7 | Transmissive | FFS | 35 | Al | Absorptive polarizing plate H | Absorptive polarizing plate C |
| Example 4 | Transmissive | FFS | 35 | Al | Absorptive polarizing plate C | Absorptive polarizing plate H |

| | Configuration of polarizing plate | k1(%) | | | Evaluation | |
|---|---|---|---|---|---|---|
| | TFT substrate side Backlight side | CF substrate side | TFT substrate side (Viewer side) | Average | Panel luminance in white display state (cd/m$^2$) | Panel luminance compared with Comparative Example 1 (time) |
| Comparative Example 1 | Reflective polarizing plate A | 86 | 82 | 84 | 593 | 1.00 |
| Comparative Example 2 | Reflective polarizing plate A | 84 | 84 | 84 | 601 | 1.01 |
| Example 1 | Reflective polarizing plate A | 82 | 86 | 84 | 608 | 1.03 |
| Comparative Example 3 | Reflective polarizing plate A | 87 | 83 | 85 | 618 | 1.04 |
| Comparative Example 4 | Reflective polarizing plate A | 85 | 85 | 85 | 626 | 1.06 |
| Example 2 | Reflective polarizing plate A | 83 | 87 | 85 | 634 | 1.07 |
| Comparative Example 5 | Reflective polarizing plate A | 88 | 84 | 86 | 648 | 1.09 |
| Comparative Example 6 | Reflective polarizing plate A | 86 | 86 | 86 | 654 | 1.10 |
| Example 3 | Reflective polarizing plate A | 84 | 88 | 86 | 667 | 1.12 |
| Comparative Example 7 | Reflective polarizing plate A | 89 | 84 | 87 | 651 | 1.10 |
| Example 4 | Reflective polarizing plate A | 84 | 89 | 87 | 672 | 1.13 |

As presented in Table 15, from the examination results of Combinations 1 to 4, the average value of the transmittance k1 of the first absorptive polarizing plate and the transmittance k1 of the second polarizing plate increases stepwise from 84% to 87% and the panel luminance also increases stepwise as the average value of the transmittances k1 of the polarizing plates increases.

On the other hand, in each combination, the magnitude relation between the transmittance k1 of the first absorptive polarizing plate and the transmittance k1 of the second polarizing plate is different between Examples and Comparative Examples. For example, in Combination 3, the transmittance k1 of the first absorptive polarizing plate is greater than the transmittance k1 of the second polarizing plate in Comparative Example 5, the transmittance k1 of the first absorptive polarizing plate is equal to the transmittance k1 of the second polarizing plate in Comparative Example 6, and the transmittance k1 of the second polarizing plate is greater than the transmittance k1 of the first absorptive polarizing plate in Example 3. In a general liquid crystal display device, absorptive polarizing plates having the same transmittance k1 are disposed on the front and back of the liquid crystal panel as in Comparative Example 6. In Comparative Example 5, Comparative Example 6, and Example 3, the transmittances k1 of the polarizing plates are 86% to be the same as each other but the panel luminance of Example 3 having a greater transmittance k1 of the second polarizing plate is the highest. This tendency is observed in other combinations as well.

This result supports that it is important to set the transmittance k1 of the second polarizing plate to be greater than the transmittance k1 of the first absorptive polarizing plate in order to improve the utilization efficiency of the backlight light reflected by the reflective layer of the TFT substrate. The recycled light reflected by the reflective layer is polarized light that vibrates in the direction parallel to the transmission axis of the second polarizing plate, and it is thus possible to more efficiently return the recycled light to the backlight unit side as the transmittance k1 of the second polarizing plate is greater. For this reason, it is considered that Example 3 has an increased luminance as compared with Comparative Example 5 and Comparative Example 6.

Moreover, in Examples 1 to 4 and Comparative Examples 1 to 7, a reflective polarizing plate is further provided between the second absorptive polarizing plate and the backlight unit. A higher luminance improving effect has been attained since it is possible to suppress the absorption of backlight light (polarized light parallel to the absorption axis of the second polarizing plate) absorbed only into the absorptive polarizing plate by using a reflective polarizing plate.

<Examination 2 on Luminance Improving Effect>

The luminance comparison was performed between Example 5, Example 6, and Comparative Example 8 in which only the second polarizing plate was disposed on the TFT substrate side. The examination results are presented in Table 16.

TABLE 16

| | Display style of liquid crystal display device | | Aperture ratio (%) | Material of reflective layer | Configuration of polarizing plate | | k1(%) | | | Evaluation | |
| | Type of transmission | Display mode | | | CF substrate side | TFT substrate side | CF substrate side | TFT substrate side (Viewer side) | Average | Panel luminance in white display state (cd/m²) | Panel luminance compared with Comparative Example 8 (time) |
|---|---|---|---|---|---|---|---|---|---|---|---|
| Comparative Example 8 | Transmissive | FFS | 35 | Al | Absorptive polarizing plate C | Absorptive polarizing plate C | 84 | 84 | 84 | 394 | 1.00 |
| Example 5 | Transmissive | FFS | 35 | Al | Absorptive polarizing plate C | Absorptive polarizing plate H | 84 | 89 | 87 | 421 | 1.07 |
| Example 6 | Transmissive | FFS | 35 | Al | Absorptive polarizing plate C | Reflective polarizing plate A | 84 | 86 | 85 | 730 | 1.85 |

As presented in Table 16, when Example 5, Example 6, and Comparative Example 8 are compared with each other, the luminance was higher than that in Comparative Example 8 and a luminance improving effect to be 1.07 to 1.85 times that in Comparative Example 8 was attained in both Example 5 and Example 6. In Comparative Example 8, an absorptive polarizing plate C is used as both the first absorptive polarizing plate and the second polarizing plate. On the other hand, in Example 5 and Example 6, an absorptive polarizing plate C is used as the first absorptive polarizing plate and an absorptive polarizing plate H or a reflective polarizing plate having a transmittance k1 greater than that of the absorptive polarizing plate C is used as the second polarizing plate. From the comparison of Example 5, Example 6, and Comparative Example 8 with each other, it has been confirmed that the backlight light recycling effect in the reflective layer increases and the luminance increases by setting the transmittance k1 of the second polarizing plate to be greater than the transmittance k1 of the first absorptive polarizing plate even in a case in which only the second polarizing plate is disposed on the TFT substrate side.

<Examination 3 on Luminance Improving Effect>

Luminance comparison was performed between Example 6, Example 3, and Example 4 and Example 7, Example 8, and Example 9. The material for the reflective layer in Example 6, Example 3 and Example 4 is Al, and the material for the reflective layer in Examples 7 to 9 is APC. The examination results are presented in Table 17.

TABLE 17

| | Display style of liquid crystal display device | | Aperture ratio (%) | Material of reflective layer | Configuration of polarizing plate | | k1 (%) | | | Evaluation | |
| | Type of transmission | Display mode | | | CF substrate side | TFT substrate side / Viewer side / Backlight side | CF substrate side | TFT substrate side (Viewer side) | Average | Panel luminance in white display state (cd/m²) | Panel luminance compared with Comparative Example 6 (time) |
|---|---|---|---|---|---|---|---|---|---|---|---|
| Example 6 | Transmissive | FFS | 35 | Al | Absorptive polarizing plate C | Reflective polarizing plate A | 84 | 86 | 85 | 730 | 1.00 |
| Example 3 | Transmissive | FFS | 35 | Al | Absorptive polarizing plate C | Absorptive polarizing plate G / Reflective polarizing plate A | 84 | 88 | 86 | 667 | 0.91 |
| Example 4 | Transmissive | FFS | 35 | Al | Absorptive polarizing plate C | Absorptive polarizing plate H / Reflective polarizing plate A | 84 | 89 | 87 | 672 | 0.92 |
| Example 7 | Transmissive | FFS | 35 | APC | Absorptive polarizing plate C | Reflective polarizing plate A | 84 | 86 | 85 | 748 | 1.02 |
| Example 8 | Transmissive | FFS | 35 | APC | Absorptive polarizing plate C | Absorptive polarizing plate G / Reflective polarizing plate A | 84 | 88 | 86 | 676 | 0.93 |
| Example 9 | Transmissive | FFS | 35 | APC | Absorptive polarizing plate C | Absorptive polarizing plate H | | | | | |

TABLE 17-continued

| | | | | | | |
|---|---|---|---|---|---|---|
| Example 9 | Reflective polarizing plate A | 84 | 89 | 87 | 679 | 0.93 |

The reflectance of Al and APC in a glass medium is 85% for Al and 93% for APC, and APC has a higher reflectance. As presented in Table 17, when Examples in which the configuration of the second polarizing plate is the same (for example, Example 6 and Example 7) are compared with each other, Examples in which the reflective layer is APC has a higher white luminance. This is due to the fact that the amount of backlight light reflected by the reflective layer increases as the reflectance of the reflective layer is higher. Incidentally, the reflectance in a glass medium is a numerical value determined by measuring the reflectance of the glass substrate on which Al and APC are formed using a spectrocolorimeter (CM-2600) manufactured by Konica Minolta Inc. and subtracting the reflectance of the glass-air interface from the measured value.

<Comparison of Contrast Ratio of Liquid Crystal Display Device>

The contrasts of the liquid crystal display devices according to Examples 3 to 9 and Comparative Examples 2 and 8 were compared with each other. The examination results are presented in Table 18.

used and Example 6 in which only a reflective polarizing plate was used. Moreover, the contrast ratio was high even when being compared with that in Comparative Example 8 and Comparative Example 2 in which the transmittances k1 of the first absorptive polarizing plate and second polarizing plate were equal to each other.

Next, the contrasts of the liquid crystal display devices of Examples 7 to 9 in which an APC film was used as the reflective layer were compared with each other. As presented in Table 18, the contrast ratio in Examples 8 and 9 in which both an absorptive polarizing plate and a reflective polarizing plate were used on the TFT substrate side was higher than that in Example 7 in which only a reflective polarizing plate was used.

From these results, it has been confirmed that a liquid crystal display device having low power consumption and favorable display quality is obtained even when the reflective layer is an Al film or an APC film since both light utilization efficiency and contrast ratio increase as a second absorptive polarizing plate having a high transmittance k1 is disposed on the TFT substrate side and a reflective polariz-

TABLE 18

| | Display style of liquid crystal display device | | | | Configuration of polarizing plate | | | Evaluation | | | |
|---|---|---|---|---|---|---|---|---|---|---|---|
| | Type of transmission | Display mode | Aperture ratio (%) | Material of reflective layer | CF substrate side | TFT substrate side | | Panel luminance in white display state (cd/m$^2$) | Panel luminance in black display state (cd/m$^2$) | Panel luminance compared with Comparative Example 3 (time) | Contrast ratio |
| | | | | | | Viewer side | Backlight side | | | | |
| Comparative Example 8 | Transmissive | FFS | 35 | Al | Absorptive polarizing plate C | Absorptive polarizing plate C | | 394 | 0.50 | 1.00 | 781 |
| Comparative Example 2 | Transmissive | FFS | 35 | Al | Absorptive polarizing plate C | Absorptive polarizing plate C | Reflective polarizing plate A | 601 | 0.50 | 1.52 | 1197 |
| Example 5 | Transmissive | FFS | 35 | Al | Absorptive polarizing plate C | Absorptive polarizing plate H | | 421 | 0.85 | 1.07 | 497 |
| Example 6 | Transmissive | FFS | 35 | Al | Absorptive polarizing plate C | Reflective polarizing plate A | | 730 | 28.98 | 1.85 | 25 |
| Example 3 | Transmissive | FFS | 35 | Al | Absorptive polarizing plate C | Absorptive polarizing plate G | Reflective polarizing plate A | 667 | 0.51 | 1.69 | 1308 |
| Example 4 | Transmissive | FFS | 35 | Al | Absorptive polarizing plate C | Absorptive polarizing plate H | Reflective polarizing plate A | 672 | 0.51 | 1.70 | 1306 |
| Example 7 | Transmissive | FFS | 35 | APC | Absorptive polarizing plate C | Reflective polarizing plate A | | 748 | 33.10 | 1.90 | 23 |
| Example 8 | Transmissive | FFS | 35 | APC | Absorptive polarizing plate C | Absorptive polarizing plate G | Reflective polarizing plate A | 676 | 0.51 | 1.72 | 1326 |
| Example 9 | Transmissive | FFS | 35 | APC | Absorptive polarizing plate C | Absorptive polarizing plate H | Reflective polarizing plate A | 679 | 0.51 | 1.72 | 1320 |

First, the contrasts of the liquid crystal display devices of Examples 3 to 6 and Comparative Examples 2 and 8 in which an Al film was used as the reflective layer were compared with each other. As presented in Table 18, the contrast ratio in Examples 3 and 4 in which both an absorptive polarizing plate and a reflective polarizing plate were used on the TFT substrate side was higher than that in Example 5 in which only an absorptive polarizing plate was ing plate is disposed between the second absorptive polarizing plate and the backlight unit.

<Examination 4 on Luminance Improving Effect and Examination on Outdoor Visibility>

Luminance comparison was performed between Example 4, Example 10, and Example 11. Furthermore, the outdoor visibility was also compared. With regard to outdoor visibility, the liquid crystal display devices according to Example 4, Example 10, and Example 11 were displayed outdoors and the visibility thereof was visually examined. The liquid crystal display device according to Example 4 was used as the reference, and it was evaluated as "excellent" if external light reflection was diminished as compared with that in Example 4. The examination results are presented in Table 19.

ellipticity of the backlight light is close to 0) as in Example 10 and Example 11 above in order to increase the recycling effect.

In Examples above, a case in which the first substrate is a counter substrate and the second substrate is a TFT substrate has been exemplified, but the effect does not change even when any of a TFT substrate or a counter

TABLE 19

| | Display style of liquid crystal display device | | Material of reflective layer | Configuration of polarizing plate | | | Evaluation | | |
|---|---|---|---|---|---|---|---|---|---|
| | Type of transmission | Display mode | | CF substrate side | TFT substrate side | | Panel luminance in white display state (cd/m$^2$) | Panel luminance compared with Example 4 (time) | Outdoor visability compared with Example 4 |
| | | | | | Viewer side | Backlight side | | | |
| Example 4 | Transmissive | FFS | Al | Absorptive polarizing plate C | Absorptive polarizing plate H | Reflective polarizing plate A | 672 | 1.00 | — |
| Example 10 | Transmissive | FFS | Al | Absorptive polarizing plate C | Absorptive polarizing plate H | Reflective polarizing plate A | 667 | 0.99 | Excellent |
| Example 11 | Transmissive | FFS | Al | Absorptive polarizing plate C | Absorptive polarizing plate H | Reflective polarizing plate A | 634 | 0.94 | Excellent |

As presented in Table 19, in Example 10 and Example 11, the first retarder ($\lambda/4$ plate) is inserted between the first absorptive polarizing plate (absorptive polarizing plate C) and the liquid crystal panel. For this reason, the laminate of the first absorptive polarizing plate and the first retarder functions as a circularly polarizing plate. In Example 10 and Example 11, internal reflection in the liquid crystal panel was cut and thus the liquid crystal display devices both exhibited more favorable visibility outdoors as compared with that in Example 4 in which a retarder was not provided.

In Example 10, the angle formed by the transmission axis between the absorptive polarizing plate H and the slow axis of the second retarder ($\lambda/2$ plate) is 45° and thus the 90° polarization direction of the backlight light (linearly polarized light) that has passed through the absorptive polarizing plate H rotates. Thereafter, the backlight is reflected by the Al reflective layer while maintaining the polarization state, then rotates by −90 degrees when being transmitted through the second retarder again, and is transmitted through the transmission axis of the absorptive polarizing plate H, and thus the backlight light can be recycled. For this reason, a luminance equal to that in Example 4 was attained while the outdoor visibility was ameliorated.

In Example 11, since the polarization state after passed through the retarder A is elliptical polarization, thus the reflection preventing effect works as a circularly polarizing plate, and the recycled light reflected by the reflective layer is slightly cut. However, the light is elliptically polarized light that is close to linearly polarized light (the ellipticity is close to 0), and thus a luminance close to that in Example 4 and Example 10 was attained.

The liquid crystal display device is not limited to liquid crystal display devices in a circular polarization mode, and there is a case in which a retarder is disposed between the liquid crystal panel and the polarizing plate on the TFT substrate side in the same manner as in Example 10 and Example 11 for the purpose of achieving viewing angle compensation of liquid crystal layers and polarizing plates. Even in such a case, it has been found that it is important to use a retarder having a retardation that does not significantly change the ellipticity of the backlight light (so that the substrate is disposed on the backlight unit side as long as the transmittance k1 of the polarizing plate (second polarizing plate) disposed on the surface facing the backlight unit of the liquid crystal panel is greater than the transmittance k1 of the first absorptive polarizing plate disposed on the other surface of the liquid crystal panel. A reflective layer for reflecting backlight light is provided on the counter substrate (CF substrate) in a case in which the first substrate is a TFT substrate and the second substrate is a counter substrate.

ADDITIONAL REMARKS

An aspect of the present invention is a liquid crystal display device which includes a first absorptive polarizing plate; a liquid crystal panel including a first substrate, a liquid crystal layer, and a second substrate in order from the first absorptive polarizing plate side; a second polarizing plate; and a backlight unit including a reflector in the stated order and in which the second substrate including a reflective layer facing the second polarizing plate and a transmittance of polarized light vibrating in a direction parallel to a transmission axis of the second polarizing plate is greater than a transmittance of polarized light vibrating in a direction parallel to a transmission axis of the first absorptive polarizing plate. As the second substrate has the reflective layer, the backlight light incident on the light shielding region such as the gate line can be reflected to the backlight unit side and the utilization efficiency of the backlight light can be improved. Furthermore, by setting the transmittance of the polarized light that vibrates in the direction parallel to the transmission axis of the second polarizing plate to be greater than the transmittance of the polarized light that vibrates in the direction parallel to the transmission axis of the first absorptive polarizing plate, the light reflected to the backlight unit side by the reflective layer can be suppressed from being absorbed into the second polarizing plate and the utilization efficiency of the backlight light can be further increased.

The second polarizing plate may be a second absorptive polarizing plate.

Furthermore, a reflective polarizing plate may be provided between the second absorptive polarizing plate and the backlight unit. By this, the light absorbed into the second absorptive polarizing plate can be reflected on the backlight unit side and reused, and thus the utilization efficiency of the backlight light can be further increased.

The second polarizing plate may be a reflective polarizing plate. By this, the absorption of backlight light can be suppressed, and thus the utilization efficiency of the backlight light can be further increased.

Furthermore, a first retarder may be provided between the first absorptive polarizing plate and the liquid crystal panel. Moreover, a second retarder may be provided between the liquid crystal panel and the second polarizing plate. By this, both the outdoor visibility of liquid crystal display device and the utilization efficiency of backlight light can be improved.

The liquid crystal display device may be a transmissive liquid crystal display device.

REFERENCE SIGNS LIST 10 first absorptive polarizing plate
20, 5020 counter substrate
30 liquid crystal layer
31 liquid crystal molecule
21, 41 transparent substrate
22 color filter layer
23 black matrix
40, 5040 thin film transistor substrate (TFT substrate)
42 first interlayer insulating layer
43, 5043 common electrode
44, 5044 second interlayer insulating layer
45, 5045 pixel electrode
46, 5046 reflective layer
47 aperture (slit)
48 semiconductor layer
50 second absorptive polarizing plate
60 reflector
61 edge light
62 light guide plate
70 reflective polarizing plate
81 first retarder
82 second retarder
100, 5100 liquid crystal panel
200 backlight unit
1000, 2000, 3000, 4000, 5000 liquid crystal display device
CH contact hole
D drain electrode
G gate line
G1 gate electrode
S source line
S1 source electrode
TFT thin film transistor
Pix subpixel

The invention claimed is:

1. A liquid crystal display device comprising:
a first absorptive polarizing plate;
a liquid crystal panel including a first substrate, a liquid crystal layer, and a second substrate in order from the first absorptive polarizing plate side;
a second polarizing plate; and
a backlight unit including a reflector in the stated order,
the second substrate including a reflective layer facing the second polarizing plate, and
a transmittance of polarized light vibrating in a direction parallel to a transmission axis of the second polarizing plate being greater than a transmittance of polarized light vibrating in a direction parallel to a transmission axis of the first absorptive polarizing plate,
wherein the second polarizing plate is a reflective polarizing plate.

2. The liquid crystal display device according to claim 1, further comprising a first retarder between the first absorptive polarizing plate and the liquid crystal panel.

3. The liquid crystal display device according to claim 1, further comprising a second retarder between the liquid crystal panel and the second polarizing plate.

4. The liquid crystal display device according to claim 1, wherein the liquid crystal display device is a transmissive liquid crystal display device.

* * * * *